US011481537B2

(12) United States Patent
Smith et al.

(10) Patent No.: US 11,481,537 B2
(45) Date of Patent: Oct. 25, 2022

(54) DOCUMENT ARCHITECTURE WITH SMART RENDERING

(71) Applicant: Open Text SA ULC, Halifax (CA)

(72) Inventors: Robert Smith, Gothenburg (SE); Johan Lorenson, Gothenburg (SE); Christian Wessman, Gothenburg (SE); Sverker Wendelöv, Gothenburg (SE)

(73) Assignee: Open Text SA ULC, Halifax (CA)

( * ) Notice: Subject to any disclaimer, the term of this patent is extended or adjusted under 35 U.S.C. 154(b) by 0 days.

(21) Appl. No.: 15/607,091

(22) Filed: May 26, 2017

(65) Prior Publication Data

US 2017/0344526 A1    Nov. 30, 2017

Related U.S. Application Data

(60) Provisional application No. 62/360,099, filed on Jul. 8, 2016, provisional application No. 62/342,459, filed on May 27, 2016.

(51) Int. Cl.
*G06F 40/103* (2020.01)
*G06F 40/131* (2020.01)
(Continued)

(52) U.S. Cl.
CPC ........ *G06F 40/103* (2020.01); *G06F 3/04847* (2013.01); *G06F 16/93* (2019.01);
(Continued)

(58) Field of Classification Search
CPC ............... G06F 17/211; G06F 17/2288; G06F 17/30011; G06F 16/93; G06F 40/103; G06F 40/131
See application file for complete search history.

(56) References Cited

U.S. PATENT DOCUMENTS 5,299,304 A    3/1994  Williams et al.
5,524,250 A    6/1996  Chesson
(Continued)

FOREIGN PATENT DOCUMENTS

WO    WO2006041340    4/2006

OTHER PUBLICATIONS

J. Thomas-Kerr, I. Burnett and C. Ritz, "Format-Independent Rich Media Delivery Using the Bitstream Binding Language," in IEEE Transactions on Multimedia, vol. 10, No. 3, pp. 514-522, Apr. 2008, (Year: 2008).*

(Continued)

*Primary Examiner* — Stephen S Hong
*Assistant Examiner* — Nicholas Hasty
(74) *Attorney, Agent, or Firm* — Sprinkle IP Law Group

(57) ABSTRACT

A document architecture system includes an intelligent document processing engine that can receive raw data streamed from external data source(s), analyze the raw data to identify triggering events, apply rules to the triggering events identified, break down the raw data accordingly, and generating messages in an internal format to represent the pieces of data without any formatting or layout information. The messages can be augmented with custom metadata and stored as fragments that reference, but that do not physically incorporate, the messages. The stored fragments can be used by the document process engine to intelligently render documents and versions thereof. The messages and fragments are in internal formats under control of the document architecture system. The renditions are in final formats that can be delivered, for instance, via an output connector to various output delivery channels.

20 Claims, 33 Drawing Sheets

(51) Int. Cl.
*G06F 40/197* (2020.01)
*G06F 16/93* (2019.01)
*G06F 3/04847* (2022.01)
*G06F 21/60* (2013.01)
*G06F 21/62* (2013.01)
*H04L 9/40* (2022.01)
*H04L 67/1095* (2022.01)

(52) U.S. Cl.
CPC .......... *G06F 21/604* (2013.01); *G06F 21/62* (2013.01); *G06F 40/131* (2020.01); *G06F 40/197* (2020.01); *H04L 63/101* (2013.01); *H04L 63/104* (2013.01); *H04L 63/123* (2013.01); *H04L 67/1095* (2013.01)

(56) References Cited

U.S. PATENT DOCUMENTS

| | | | |
|---|---|---|---|
| 5,713,014 | A | 1/1998 | Durflinger et al. |
| 5,911,776 | A | 6/1999 | Guck |
| 5,970,490 | A | 10/1999 | Morgenstern |
| 5,995,996 | A | 11/1999 | Venable |
| 6,012,098 | A | 1/2000 | Bayeh et al. |
| 6,151,608 | A | 11/2000 | Abrams |
| 6,172,988 | B1 | 1/2001 | Tieman et al. |
| 6,236,997 | B1 | 5/2001 | Bodamer et al. |
| 6,243,107 | B1 | 6/2001 | Valtin et al. |
| 6,263,332 | B1 | 7/2001 | Nasr et al. |
| 6,275,536 | B1 | 8/2001 | Chen et al. |
| 6,324,568 | B1 | 11/2001 | Diec |
| 6,336,124 | B1 | 1/2002 | Alam et al. |
| 6,336,139 | B1 | 1/2002 | Feridun et al. |
| 6,397,232 | B1 | 5/2002 | Cheng-Hung et al. |
| 6,484,178 | B1 | 11/2002 | Bence, Jr. et al. |
| 6,587,972 | B1 | 7/2003 | Baird et al. |
| 6,623,529 | B1 | 9/2003 | Lakritz |
| 6,643,701 | B1 | 11/2003 | Aziz |
| 6,668,254 | B2 | 12/2003 | Matson et al. |
| 6,748,020 | B1 | 6/2004 | Eifrig et al. |
| 6,782,379 | B2 | 8/2004 | Lee |
| 6,810,429 | B1 | 10/2004 | Walsh et al. |
| 6,816,871 | B2 | 11/2004 | Lee |
| 6,877,156 | B2 | 4/2005 | Osborne et al. |
| 7,043,687 | B2 | 5/2006 | Knauss et al. |
| 7,054,952 | B1 | 5/2006 | Schwerdtfeger et al. |
| 7,055,096 | B2 | 5/2006 | Namioka |
| 7,127,520 | B2* | 10/2006 | Ladd .......... G06F 9/546 375/240.26 |
| 7,143,087 | B2 | 11/2006 | Fairweather |
| 7,213,249 | B2 | 5/2007 | Loo et al. |
| 7,216,163 | B2 | 5/2007 | Sinn |
| 7,225,256 | B2 | 5/2007 | Villavicencio |
| 7,257,600 | B2 | 8/2007 | Matson et al. |
| 7,284,235 | B2* | 10/2007 | Nachmanson .......... G06F 8/71 714/E11.207 |
| 7,302,678 | B2 | 11/2007 | Bohlmann et al. |
| 7,308,399 | B2 | 12/2007 | Fallen-Bailey et al. |
| 7,461,403 | B1 | 12/2008 | Libenzi et al. |
| 7,478,402 | B2 | 1/2009 | Christensen et al. |
| 8,380,830 | B2 | 2/2013 | Ladd et al. |
| 8,788,699 | B2 | 7/2014 | Kitagata |
| 8,825,627 | B1 | 9/2014 | Indukuri |
| 8,914,809 | B1* | 12/2014 | Cohen .......... H04L 51/066 719/313 |
| 9,047,146 | B2 | 6/2015 | Ladd et al. |
| 9,237,120 | B2 | 1/2016 | Cohen |
| 9,400,703 | B2 | 7/2016 | Ladd et al. |
| 10,210,028 | B2 | 2/2019 | Ladd |
| 10,496,458 | B2 | 12/2019 | Ladd et al. |
| 10,534,843 | B2 | 1/2020 | Smith et al. |
| 10,606,921 | B2 | 3/2020 | Lorensson |
| 10,922,158 | B2 | 2/2021 | Ladd |
| 11,106,856 | B2 | 8/2021 | Lorensson |
| 11,263,383 | B2 | 3/2022 | Smith |
| 2001/0047369 | A1 | 11/2001 | Aizikowitz et al. |
| 2001/0056362 | A1 | 12/2001 | Hanagan et al. |
| 2002/0059076 | A1 | 5/2002 | Grainger |
| 2002/0065848 | A1* | 5/2002 | Walker .......... G06F 40/166 715/205 |
| 2002/0083124 | A1 | 6/2002 | Knox |
| 2002/0083205 | A1 | 6/2002 | Leon et al. |
| 2002/0165975 | A1 | 11/2002 | Abbott |
| 2003/0023336 | A1 | 1/2003 | Kreidler et al. |
| 2003/0065623 | A1* | 4/2003 | Corneil .......... G06Q 20/382 705/64 |
| 2003/0085902 | A1 | 5/2003 | Vogelaar |
| 2004/0133635 | A1* | 7/2004 | Spriestersbach .... G06F 16/9577 709/203 |
| 2004/0143738 | A1 | 7/2004 | Savage |
| 2005/0071150 | A1 | 3/2005 | Nasypny |
| 2005/0160086 | A1 | 7/2005 | Haraguchi et al. |
| 2005/0240876 | A1* | 10/2005 | Myers .......... G06F 17/2247 715/763 |
| 2006/0064467 | A1 | 3/2006 | Libby |
| 2006/0095511 | A1 | 5/2006 | Munarriz et al. |
| 2006/0233108 | A1 | 10/2006 | Krishnan |
| 2009/0064175 | A1 | 3/2009 | Taylor et al. |
| 2009/0254572 | A1 | 10/2009 | Redlich |
| 2010/0325102 | A1 | 12/2010 | Maze |
| 2010/0332973 | A1 | 12/2010 | Kloiber et al. |
| 2011/0296048 | A1* | 12/2011 | Knox .......... H04L 65/605 709/231 |
| 2013/0081132 | A1 | 3/2013 | Lee |
| 2016/0012465 | A1 | 1/2016 | Sharp |
| 2016/0162478 | A1 | 6/2016 | Blassin |
| 2016/0232143 | A1* | 8/2016 | Fickenscher .......... G06F 40/123 |
| 2016/0253841 | A1 | 9/2016 | Ur et al. |
| 2016/0255076 | A1 | 9/2016 | Lee |
| 2016/0283296 | A1 | 9/2016 | Ladd et al. |
| 2017/0344547 | A1 | 11/2017 | Smith |
| 2017/0346828 | A1 | 11/2017 | Lorensson |
| 2019/0121684 | A1 | 4/2019 | Ladd et al. |
| 2020/0065168 | A1 | 2/2020 | Ladd et al. |
| 2020/0117849 | A1 | 4/2020 | Smith |
| 2020/0193082 | A1 | 6/2020 | Lorensson |
| 2021/0124631 | A1 | 4/2021 | Ladd |
| 2021/0365626 | A1 | 11/2021 | Lorensson |
| 2022/0164519 | A1 | 5/2022 | Smith |

OTHER PUBLICATIONS

Office Action for U.S. Appl. No. 10/184,430, dated Sep. 21, 2005, 12 pgs.
Office Action for U.S. Appl. No. 11/583,369, dated Apr. 3, 2009, 8 pgs.
Office Action for U.S. Appl. No. 12/573,352, dated Sep. 13, 2010, 9 pgs.
Office Action for U.S. Appl. No. 13/092,771, dated Jul. 20, 2011, 12 pgs.
Office Action for U.S. Appl. No. 13/092,771, dated Jan. 4, 2012, 13 pgs.
Office Action for U.S. Appl. No. 13/745,096, dated Sep. 30, 2013, 10 pgs.
Office Action for U.S. Appl. No. 13/454,492, dated Nov. 26, 2013, 18 pgs.
Office Action for U.S. Appl. No. 13/745,096, dated Jan. 15, 2014, 15 pages.
Office Action for U.S. Appl. No. 13/745,096, dated Jul. 25, 2014, 16 pgs.
Office Action for U.S. Appl. No. 14/638,700, dated Mar. 26, 2015, 14 pgs.
Final Office Action issued for U.S. Appl. No. 14/638,700, dated Oct. 6, 2015, 13 pages.
Office Action issued for U.S. Appl. No. 15/174,591, dated Feb. 3, 2017, 22 pages.
Final Office Action issued for U.S. Appl. No. 15/174,591, dated Jul. 21, 2017, 19 pages.
Müldner, Tomasz, Robin McNeill and Jan Krzysztof Miziołek in "Secure Publishing using Schema-level Role-based Access Control Policies for Fragments of XML Documents." Presented at Balisage:

(56) References Cited

OTHER PUBLICATIONS

The Markup Conference 2008, Montréal, Canada, Aug. 12-15, 2008. In Proceedings of Balisage: The Markup Conference 2008. Balisage Series on Markup Technologies, vol. 1 (2008), DOI:10.4242/BalisageVol1.Muldner01.

Notice of Allowance for U.S. Appl. No. 15/174,591, dated Sep. 21, 2018, 9 pgs.

Notice of Allowance issued for U.S. Appl. No. 16/228,346, dated May 28, 2019, 9 pgs.

Office Action for U.S. Appl. No. 15/607,111, dated Jan. 30, 2019, 55 pgs.

Office Action for U.S. Appl. No. 15/607,111, dated Jul. 12, 2019, 62 pgs.

Sihem Amer-Yahia et al., A Web-Services Architecture for Efficient XML Data Exchange, 2004, Proceedings of the 20th Int'l Conf on Data Engineering (ICDE'04), pp. 1-12.

Notice of Allowance for U.S. Appl. No. 15/607,036, dated Jul. 18, 2019, 2 pgs.

Office Action for U.S. Appl. No. 15/607,036, dated Apr. 17, 2019, 7 pgs.

Notice of Allowance for U.S. Appl. No. 16/228,346, dated Sep. 16, 2019, 5 pgs.

Notice of Allowance for U.S. Appl. No. 15/607,036, dated Oct. 24, 2019, 5 pgs.

Notice of Allowance for U.S. Appl. No. 15/607,111, dated Nov. 19, 2019, 13 pgs.

Nord, et al., "Reviewing Architecture Documents Using Question Sets," 2009 Joint Working IEEE/IFIP Conference on Software Architecture & European Conference on Software Architecture, Sep. 2009, pp. 1-4.

Notice of Allowance for U.S. Appl. No. 16/669,220, dated Oct. 27, 2020, 9 pgs.

Office Action for U.S. Appl. No. 16/708,069, dated Jun. 14, 2021, 7 pgs.

Notice of Allowance issued for U.S. Appl. No. 16/797,896, dated May 26, 2021, 19 pages.

Office Action for U.S. Appl. No. 17/139,759, dated Oct. 15, 2021, 22 pgs.

Notice of Allowance for U.S. Appl. No. 16/708,069, dated Oct. 21, 2021, 2 pgs.

\* cited by examiner

| Utility Co. | Pay Now ▶ | Total Balance Due $511.33 | Due Date 1/4/2016 | Account Number XXXX36400034 |

Jane Doe
123 Main Street
Great City, MI 48888

Make a Triple Play. Enroll in Utility Co's Automatic Payment, eBill Paperless Billing or BudgetWise Billing by June 15 and be automatically entered for a chance to win a tablet, eReader or laptop computer! Go to Utilityco.com/tripleplay

A DEDICATED BUSINESS CENTER JUST FOR YOU.

Learn more

Bill Summary

| | |
|---|---|
| Account Balance as of 11/30/2015 | 822.47 |
| Payment Received 11/27/2015 | -822.47 |
| Balance Prior to Current Charges | 0.00 |
| Current Charges | |
| Utility Co. Electric Company Business Electric Service | 94.48 |
| Utility Co. Gas Company Gas Commercial Heating | 416.85 |
| Total Current Charges | 511.33 |
| Account Balance as of 12/31/2015 | 511.33 |

Pay Now ▶
Current Bill ▶
View This Month's Bill Inserts ▶
Previous Bills ▶

Usage Summary

Utility Co. Electric Company Business Electric Service Current Billing Information Service Period Dec 1. 1, 2015 - Dec. 31, 2015
Days Billed: 31

Usage History - Average per day

| | Current Month | Last Month | Year Ago |
|---|---|---|---|
| KWH Usage | 27.7 | 33.1 | 29.3 |
| Change | | -16% | -5% |

Utility Co. Gas Company Gas Commercial heating Current Billing Information

Service Period Dec 1. 1, 2015 - Dec. 31, 2015
Days Billed: 31

610

Be More Energy Efficient

Let our interactive business show you how to take control of your energy use.

Visit our Interactive Business

Business Energy Analyzer

Online tools designed to help Businesses save energy.

View the Video

Landlord Program

If you own rental properties, our Automatic Transfer of Service program effectively transfer's service responsibility between tenant and landlord.

Learn More

MRS. AA FEMALE SAP AAA
ALTERNATE ADDRESS STREET

Below are the details of your billing as of 15/06/2014

| | |
|---|---|
| Regular Premium Due 15/06/2014 : | PHP 31,250.00 |
| Regular Top Up : | PHP 55,000.00 |
| Less: Excess Deposit : | 8,750.00 |
| TOTAL DUE as of 15/06/2014 : | PHP 31,250.00 |

Please pay on or before 15/06/2014 to avoid any inconvenience.

For more information on your policy/ies and other service requests, you may access your amount through XYZ Customer Connect Portal through www.xyz.com.ph. You may also contact your agent, or email us at CustomerConnect.ph@xyz.com or call our Customer Connect Hotline at (632) 555-8355.

Pay through Auto Debit by accomplishing an Authorization to Debit Form.

Pay through Auto Charge by accomplishing a Credit Card enrolment Form.

When making a payment, please indicate the 2-digit transaction code + 8-digit policy number in the Account Number (BDO/Metrobank) or Policy Reference Number (BPI) fields of the Bills Payment Slip.

Please refer to the list of transaction codes below:

03 + Subsequent Payment
04 + Balance to Annual Payment
05 + Lump Sum Top
06 + Reinstatement Payment
09 + Balance for Policy Change

XYZ

| BILLING SUMMARY for Policy No. 00000340 ||
|---|---|
| Premium Due | Due Date |
| PHP 31,250.00 | 15/06/2014 |

Please pay on or before the due date to keep your policy in force

Policy Number : 00000340
Base Plan Name : DEMO
Name of Assured : MRS. AA FEMALE SAP AAA
Sum Assured : 500,000.00
Currency : Peso
Mode of Payment : DEMO

LIFE INSURANCE — 710

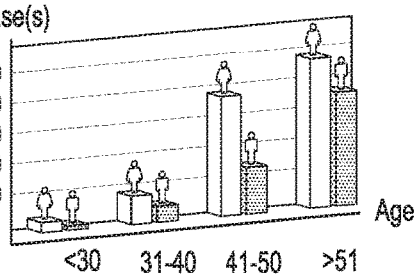
Claim Case(s) — 715

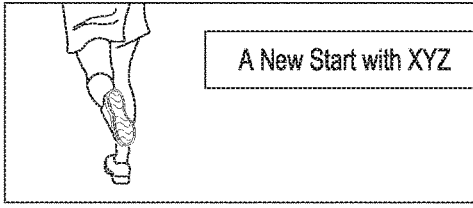
A New Start with XYZ — 720

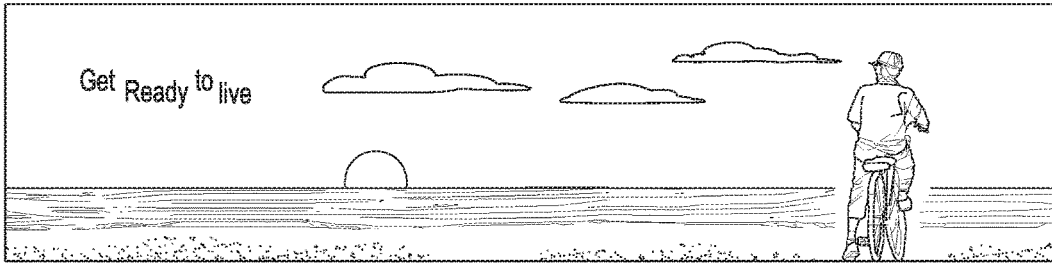
Get Ready to live — 725

MRS. AA FEMALE SAP AAA
ALTERNATE ADDRESS STREET

Below are the details of your billing as of 15/06/2014

| | |
|---|---|
| Regular Premium Due 15/06/2014 : | PHP 31,250.00 |
| Regular Top Up : | PHP 55,000.00 |
| Less: Excess Deposit : | 8,750.00 |
| TOTAL DUE as of 15/06/2014 : | PHP 31,250.00 |

XYZ

| BILLING SUMMARY for Policy No. 00000340 ||
|---|---|
| Premium Due | Due Date |
| PHP 31,250.00 | 15/06/2014 |

Please pay on or before the due date to keep your policy in force

| | | |
|---|---|---|
| Policy Number | : | 00000340 |
| Base Plan Name | : | DEMO |
| Name of Assured | : | MRS. AA FEMALE SAP AAA |
| Sum Assured | : | 500,000.00 |
| Currency | : | Peso |
| Mode of Payment | : | DEMO |

Please pay on or before 15/06/2014 to avoid any inconvenience.

For more information on your policy/ies and other service requests, you may access your amount through XYZ Customer Connect Portal through www.xyz.com.ph. You may also contact your agent, or email us at CustomerConnect.ph@xyz.com or call our Customer Connect Hotline at (632) 555-8355.

Pay through Auto Debit by accomplishing an Authorization to Debit Form.

Pay through Auto Charge by accomplishing a Credit Card enrolment Form.

When making a payment, please indicate the 2-digit transaction code + 8-digit policy number in the Account Number (BDO/Metrobank) or Policy Reference Number (BPI) fields of the Bills Payment Slip.

Please refer to the list of transaction codes below:

- 03 + Subsequent Payment
- 04 + Balance to Annual Payment
- 05 + Lump Sum Top
- 06 + Reinstatement Payment
- 09 + Balance for Policy Change

*This is a system-generated correspondence. If issued without alteration, this does not require a signature.*
cc: SWAPNIL TEST AGENT/60000003/Agent sales unit 00003

XYZ Customer Confidential

XYZ Life Insurance Corporation
120 Fifth Street., 5th Avenue, Alpha City, Pasig City 1634 Philippines
T: (555) 888 8393 | F: (555)558 7393

XYZ.COM.PH

```
<invoice nr="123">
....
</invoice>
```
~730

XYZ

18/05/2014

MRS. AA FEMALE SAP AAA
ALTERNATE ADDRESS STREET

Below are the details of your billing as of 15/06/2014

| Regular Premium Due 15/06/2014 | : | PHP 31,250.00 |
| Regular Top Up | : | PHP 55,000.00 |
| Less: Excess Deposit | : | 8,750.00 |

TOTAL DUE as of 15/06/2014 : PHP 31,250.00

Please pay on or before 15/06/2014 to avoid any inconvenience.

| BILLING SUMMARY for Policy No. 00000340 ||
|---|---|
| Premium Due PHP 31,250.00 | Due Date 15/06/2014 |

Please pay on or before the due date to keep your policy in force

| Policy Number | : | 00000340 |
| Base Plan Name | : | DEMO |
| Name of Assured | : | MRS. AA FEMALE SAP AAA |
| Sum Assured | : | 500,000.00 |
| Currency | : | Peso |
| Mode of Payment | : | DEMO |

For more information on your policy/ies and other service requests, you may access your amount through XYZ Customer Connect Portal through www.xyz.com.ph. You may also contact your agent, or email us at CustomerConnect.ph@xyz.com or call our Customer Connect Hotline at (632) 555-8355.

Pay through Auto Debit by accomplishing an Authorization to Debit Form.

Pay through Auto Charge by accomplishing a Credit Card enrolment Form.

PRODUCT ADVERTISEMENT

When making a payment, please indicate the 2-digit transaction code + 8-digit policy number in the Account Number (BDO/Metrobank) or Policy Reference Number (BPI) fields of the Bills Payment Slip.

Please refer to the list of transaction codes below:

03 + Subsequent Payment
04 + Balance to Annual Payment
05 + Lump Sum Top
06 + Reinstatement Payment
09 + Balance for Policy Change

*This is a system-generated correspondence. If issued without alteration, this does not require a signature.*
cc: SWAPNIL TEST AGENT/60000003/Agent sales unit 00003

XYZ Customer Confidential

XYZ Life Insurance Corporation
120 Fifth Street., 5th Avenue, Alpha City, Pasig City 1634 Philippines
T: (555) 888 8393 | F: (555)558 7393

XYZ.COM.PH

| | | | | | | | □ □ × |
|---|---|---|---|---|---|---|---|
| Document Overview: My D... × | StreamStudio × | + | | | | | | localhost /OTCS/livelink.exe?func=ll&objectaction=overview&objid=66345 ▽ C | Q Search | ☆ | ⇧ | ⇩ | ≡ | ◯ | ✎ | ⊕ | ▼ | ⊙ | ▽

OPENTEXT | Content Server

Enterprise ∨ | Personal ∨ | Tools ∨ | Admin ∨ | ⊙ ∨         Search | Search *Enterprise* 🔍

Navigate To... | ▼ | ⌂        Open | Download

📄 My Document Definition 2015.pdf ∨ 💬

| General | Specific | Categories | Classifications | Follow Ups | Ratings | References | Versions |
|---|---|---|---|---|---|---|---|

| Version ▼ | File Name | Size | Created | Created By | Storage Provider |
|---|---|---|---|---|---|
| 3 | 2403512 ∨ | 16 KB | 03/16/2015 11:21 PM | Admin | Default(External Document Storage) |
| 2 | 2261051 ∨ | 16 KB | 03/16/2015 11:19 PM | Admin | Default(External Document Storage) |
| 1 | My Document Definition 2015.pdf ∨ | 1 KB | 03/16/2015 11:19 PM | Admin | Default(External Document Storage) |

Purge all versions except the most recent: | 1 | Purge Versions

Admin 03/16/2015      OpenText Content Server 10 Service Pack 2. Copyright© 1995 - 2014 by Open Text Corporation. All rights reserved.

localhost/OTCS/livelink.exe?func=Enterprise.Home stream | ⟨ | ⟩ | Highlight All | Match Case | 1 of 5 matches      ×

FIG. 23

DOCUMENT ARCHITECTURE WITH SMART RENDERING

CROSS-REFERENCE TO RELATED APPLICATIONS

This is a conversion of, and claims a benefit of priority from U.S. Provisional Application No. 62/342,459, filed May 27, 2016, entitled "DOCUMENT ARCHITECTURE WITH EFFICIENT STORAGE AND SMART RENDERING," and U.S. Provisional Application No. 62/360,099, filed Jul. 8, 2016, entitled "DOCUMENT ARCHITECTURE WITH FRAGMENT-DRIVEN ROLE-BASED ACCESS CONTROLS," the disclosures of which are fully incorporated herein in their entireties.

TECHNICAL FIELD

This disclosure relates generally to document management systems and methods. More particularly, this disclosure relates to document management systems, methods, and architecture with intelligent rendering useful for processing data streams.

BACKGROUND OF THE RELATED ART

In computing, a data stream refers to a sequence of data elements that a system may receive over time. Often the data elements are processed one at a time as the data stream is received. This is quite unlike batch data processing, in which a finite amount of data is received in batches and the finite amount of data is processed as a whole per batch. This is also quite unlike bulk data processing, in which a finite amount of data is received at once and then processed as a whole. That is, normal computer functions cannot operate on data streams as a whole. Rather, processing data streams requires a steady high-speed rate sufficient to support applications that consume the data streams and a queuing or buffering mechanism to make sure that enough data is being continuously received without any noticeable time lag.

To this end, U.S. Pat. No. 7,127,520 utilizes queuing in a data transformation solution for transforming an input data stream in a first data format to an output data stream in a second format. The input data stream is stored in one of a plurality of input queues. The input queues are operatively connected to job threads. The job threads, independent of one another and in parallel, receive input data streams from the input queues, format the input data steams into output data streams, and store the output data streams in the output queues, from where output connectors can pick them up and pass them on to their final destination. The use of queuing is one embodiment of the system disclosed in U.S. Pat. No. 7,127,520.

U.S. Pat. No. 8,914,809 provides another solution for processing data streams. In this case, a message broker can be configured to receive the message instances output as input message instances, store the input message instances in a message store, alter the structure or content of the input message instances according to a message brokering model to generate output message instances and provide output message instances to one or more downstream processors. This solution allows for autonomous storage and alteration of messages generated when processing a data stream of a first format to transform it into a second format.

With the amount of data produced by data streams growing continuously in today's world, management and processing of data stream have become exceedingly complex. Accordingly, there is a continuing need for innovations and improvements.

SUMMARY OF THE DISCLOSURE

This disclosure is directed to a new and improved document architecture (DA) that utilizes document fragments to construct documents of different versions, the versions including different software (e.g., content server) platform-specific versions, user-based role versions, different contextual versions, etc. In one aspect, the entire set of document versions may represent a genus of the document and each version a species of the genus. The DA uses document fragments to construct the different portions of the documents. The DA need not save each document, as a whole (e.g., a Word document, a Portable Document Format (PDF) file, a spreadsheet file, a presentation file, etc.), in storage; instead, the DA can save a single instance of the document fragments (that make up a document) in storage. This has a technical effect of storing "documents" in a much more efficient manner than conventional document storage solutions. The DA can use a single instance of such a "document" to render versions of the document for output. The DA provides many advantages by representing a genus of documents using document fragments instead of the multitude of fully "assembled" document versions.

In some embodiments, a method implementing the DA disclosed herein may include importing a document, for instance, via an input connector, analyzing the document to break it apart into pieces of data, applying rules to the pieces of data (e.g., metadata, headers, any designated parts, etc.) and persisting them in an internal system format (referred to herein as "messages" or "normalized fragments") in a data storage device referred to herein as a message store. A system implementing the DA disclosed herein has full control of messages stored in the message store.

The system may further process the system-formatted messages to augment, extend, or otherwise refine them with additional information/instructions. The refined results (referred to herein as "formatted data" or "formatted fragments") are checked for uniqueness and stored in another data storage device referred to herein as a document broker plus storage. As a result, only unique formatted fragments, and no duplicates, are stored in the document broker plus storage ready for use and reuse by downstream processes in the DA.

Subsequently, fragments may be retrieved from the document broker plus storage for post processing/formatting. This may involve assembling a document using the stored fragments based on instructions from a document definition associated with the document. After the document is assembled, the system invokes a driver/renderer to produce an output (e.g., a version of the document). A document may be rendered this way in different versions and in any desired format using the stored fragments. The inventive techniques include ways to include and exclude the fragments for the genus of documents and to render a species of the genus that includes a specific formatted version of the document. Furthermore, new documents may be generated from various combinations of fragments. A new document may be generated in a new or different format than the original format of a document or documents from which fragments are used to generate the new document. In some embodiments, a system implementing the DA disclosed herein may not store rendered documents—only fragments are kept in storage in the DA. Furthermore, in some embodiments, only unique fragments are stored. Since fragments can be used and reused, potentially infinitely, the system can prove to be highly efficient in data storage, particularly when the amount of data being processed is huge (e.g., hundreds of thousands, millions, or billions of documents), and can provide for intelligent and efficient document production, management, storage, and rendering.

In one embodiment, a system implementing the DA disclosed herein may comprise at least one processor, at least one non-transitory computer-readable storage medium, and stored instructions translatable by the at least one processor to perform a method substantially as described herein. Another embodiment comprises a computer program product having at least one non-transitory computer-readable storage medium storing instructions translatable by at least one processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 6A-6D depict diagrammatic representations of example versions of a document rendered from fragments augmented with rich information.

FIG. 7A depicts a diagrammatic representation of an example document in a conventional archive format.

FIGS. 7B-7C depict diagrammatic representations of example renditions of the document shown in FIG. 7A according to some embodiments.

FIG. 10 depicts a diagrammatic representation of a user interface of an example of a content server integrated with an example of the document architecture disclosed herein according to some embodiments.

FIGS. 11-23 provide examples of user interactions with the content server of FIG. 10 according to some embodiments

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
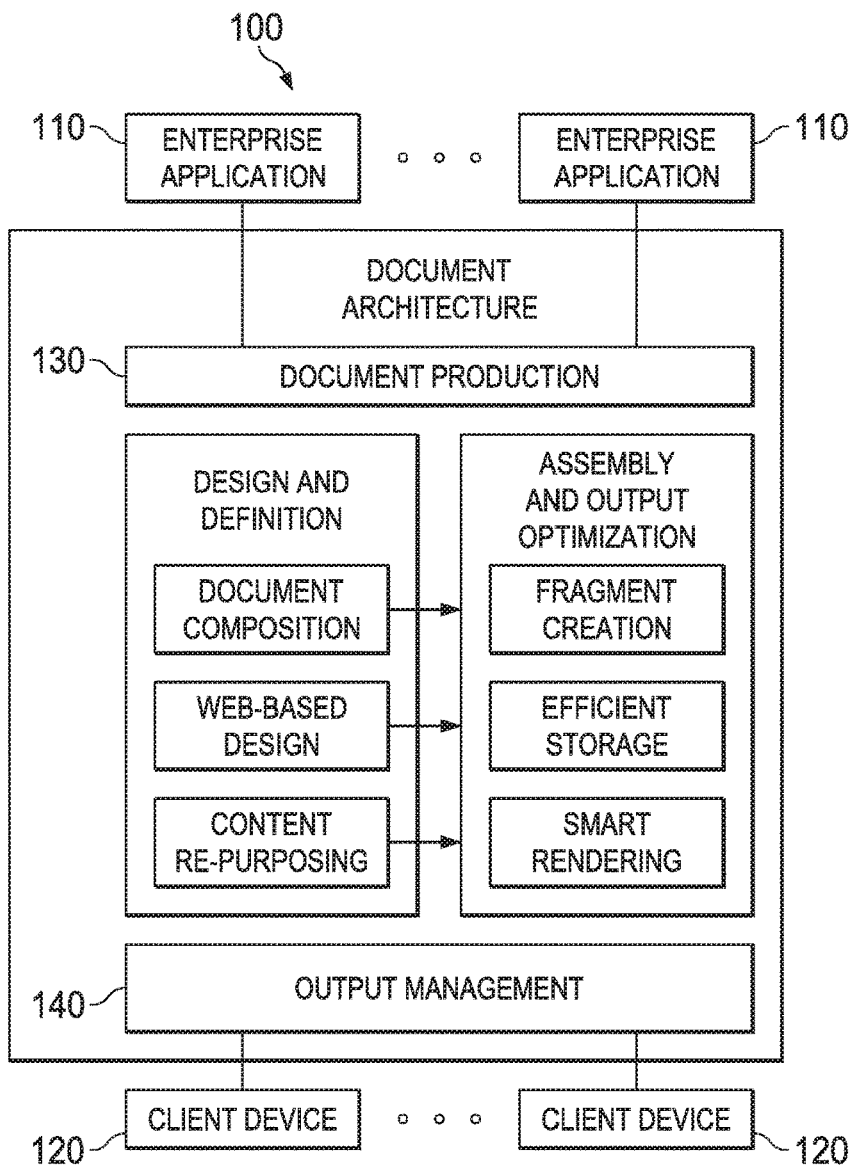
FIG. 1 depicts a diagrammatic representation of an example document architecture according to some embodiments.

FIG. 1 depicts a diagrammatic representation of an example of new and improved document architecture (DA) 100 according to some embodiments. DA 100 includes special functions that can facilitate an enterprise to communicate, for instance, with their customers and suppliers, trigger internal processes by enterprise systems (which are large-scale application software packages that support business processes information flows, reporting, and data analytics in complex organizations), and/or facilitate commercial transactions. To this end, DA 100 may include document production layer 130 that interfaces with enterprise applications 110 and output management layer 140 that interfaces with client devices 120 that utilize outputs from enterprise applications 110.

The special functions of DA 100 may be explained from the creation of a document (e.g., the "Design and Definition" stage shown in FIG. 1) to its delivery (e.g., the "Assembly and Output Optimization" stage shown in FIG. 1). In an enterprise computing environment, the creation of a document may begin with the creation of a document type. For example, DA 100 may include a design tool (e.g., "Design Center," "StoryTeller," "StoryBoard," "Supervisor," etc. which can be represented by enterprise application(s) 110 in FIG. 1) that provides the capabilities needed to develop all the settings and parameters for collecting, composing, presenting, and managing customer communications, including connecting to source applications, identifying/extracting input data; transforming, formatting, processing, and sorting data, and delivering output to the appropriate device.

Using such a design tool, a user (e.g., a document designer) can create a master template for each document type. A template for a particular document type may define all elements of a document of that particular type such as the structure, page design, and layout, and include logos, color, standard information such as name, date, and address, etc. Depending upon document type, a template may additionally define multi-columns, paths for variable data, variable images, charts, graphs, complex tables, complex presentation logic, and so on. The design tool may be a web-based service provided by DA 100. With defined document types, enterprise users in various roles (e.g., manager, reviewer, writer, etc.) can create, manage, and distribute documents through DA 100.

A system implementing DA 100 can be characterized as a high capacity, high speed data transformation system, processing millions and billions of documents a year. Previously, documents may be processed via uniquely programmed data streams, an example of which is described in the above-referenced U.S. Pat. No. 7,127,520. Specifically, input data of a particular format is broken apart using a filter to recognize events within an input data stream. A message generator is configured for generating messages from the events. A processor processes the messages to generate meta-records that include unformatted data (not formatted for any specific output device). A formatter formats the meta-records for an output data stream. As discussed above, this solution involves the use of a queue to store the input data stream and the use of job threads that can handle input data streams in parallel. The messages themselves, however, were not persisted.

In the above-referenced U.S. Pat. No. 8,914,809, such messages can be persisted. Specifically, input data streams can be processed to parse out messages. A parsing model may be defined to break apart and reformat the messages. The messages can be persisted in a message store and used to generate different alterations of the input data streams, for instance, by concatenating messages from different input data streams to generate output message instances. The output message instances can then be provided to one or more downstream processors. This solution decouples input data stream processing from output data stream processing and allows for autonomous storage and alteration of messages generated when processing a data stream of a first format to transform it into a second format.

Figure 2:
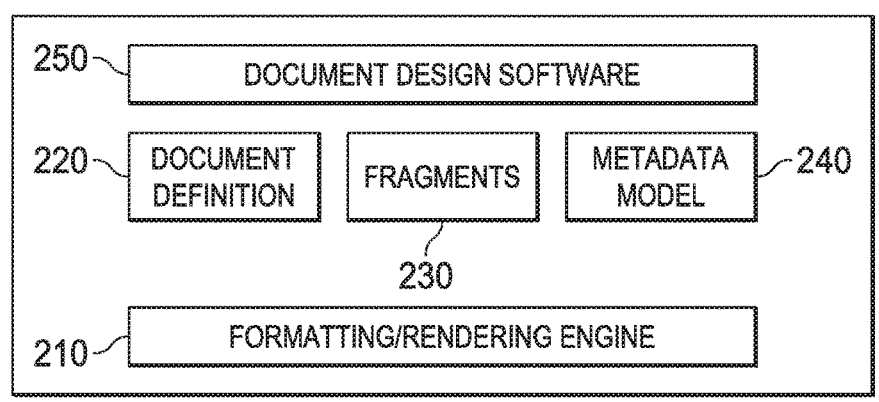
FIG. 2 depicts a diagrammatic representation of example features of the document architecture shown in FIG. 2.

A new and improved DA described herein can efficiently store formatted data with significantly reduced storage requirements. To this end, in some embodiments, a system implementing the DA disclosed herein (e.g., DA 200 shown in FIG. 2) may include an engine (e.g., formatting/rendering engine 210) that can take a document definition file (e.g., document definition 220) generated by document design software or tool (e.g., document design software 250), break it apart into fragments (e.g., fragments 230), process and store the processed fragments efficiently, and utilize the processed fragments to intelligently render a document (and/or a version or versions thereof) described by an associated metadata model (e.g., metadata model 240). At runtime, properties in the metadata model can be exchanged with real customer data. Details and examples of metadata models and use cases are discussed further below.

Figure 3:
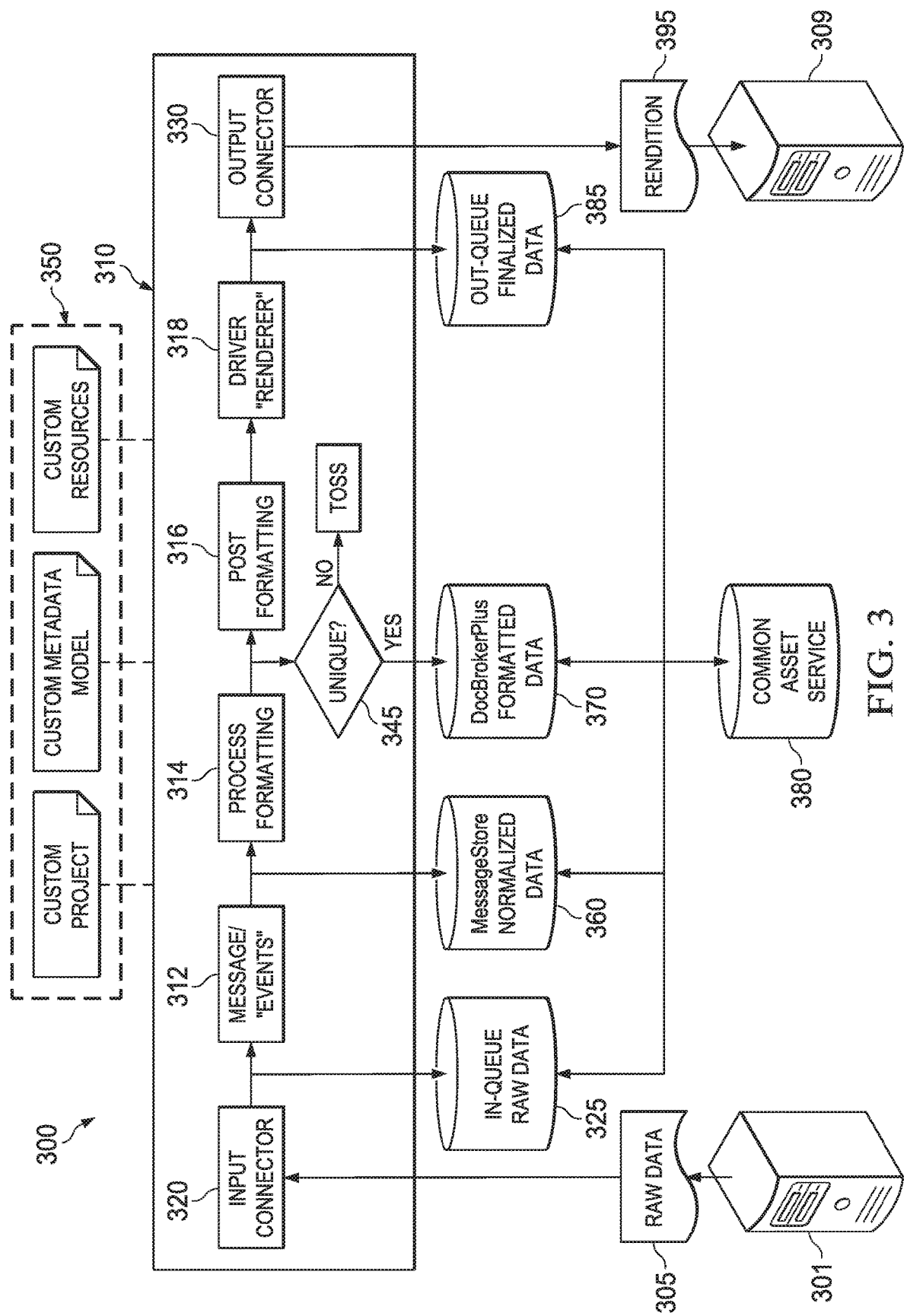
FIG. 3 depicts a diagrammatic representation of example operations performed by a formatting/rendering engine according to some embodiments.
Figure 4:
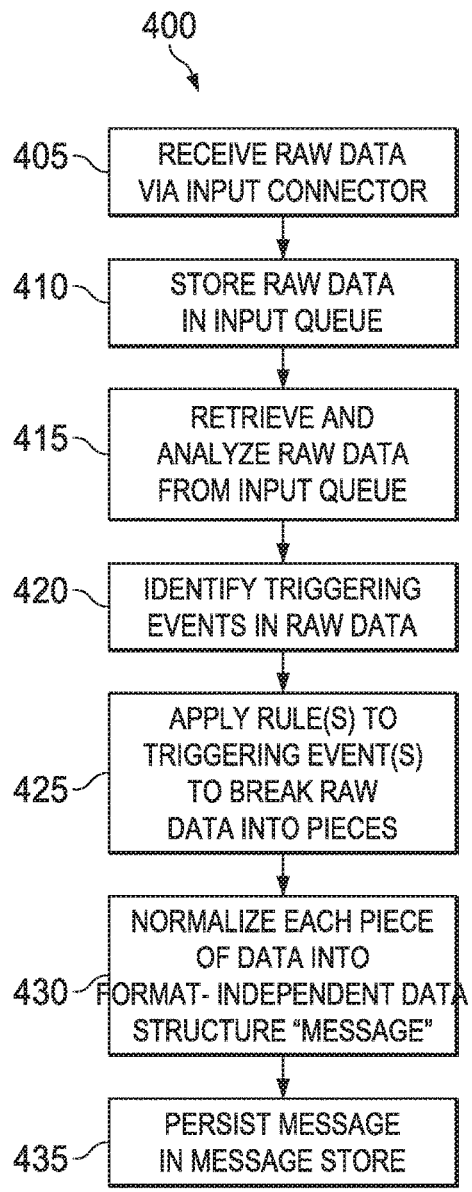
FIG. 4 depicts a flow chart illustrating an example method of efficient storage according to some embodiments.
Figure 5:
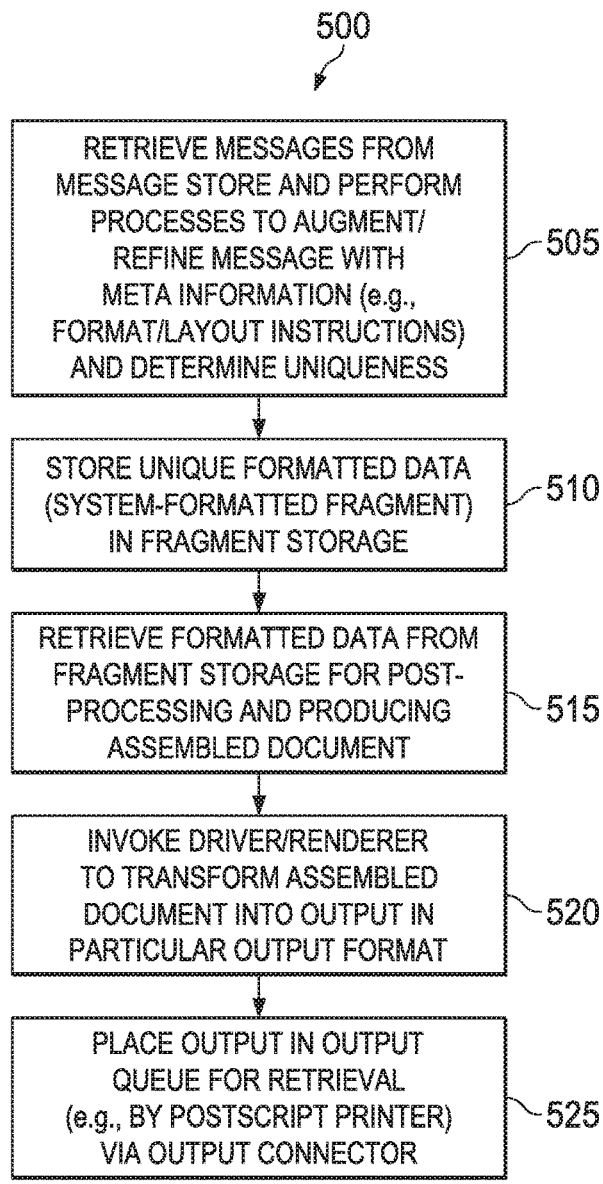
FIG. 5 depicts a flow chart illustrating an example method of smart rendering according to some embodiments.

Example operations performed by the formatting/rendering engine are illustrated in FIG. 3. In the example illustrated, DA system 300 includes formatting/rendering engine 310. In computer programming, an engine refers to a program or a group of programs that perform(s) a core or essential function for other programs. In the example of FIG. 3, formatting/rendering engine 310 is particularly equipped with a plurality of components 312, 314, 316, and 318. These components are further described below with reference to DA system 300 shown in FIG. 3, method 400 shown in FIG. 4, and method 500 shown in FIG. 5.

In some embodiments, an input connector (e.g., input connector 320, which can be one of a plurality of input connectors) communicatively connected to a data source (e.g., data source 301, which can be one of a plurality of data sources such as enterprise applications, client devices, or any external data systems or providers, etc.) can receive/accept raw input data (e.g., raw data 305) from the data source via an appropriate connectivity method and/or protocol (e.g., HTTP) (405). In some embodiments, multiple input connectors can be developed and/or customized (e.g., by third-party developers). Examples of an input connector can include, but are not limited to, a directory scanner (e.g., the directory scanner may be particularly configured for scanning a certain directory), a file system manager (e.g., the file system manager may be particularly configured for detecting any changes to and managing data stored in a certain file system), a web service with a designated HTTP port (e.g., the web service is particularly configured to "listen" and detect an incoming data stream via the HTTP port), etc.

The raw data (e.g., raw data 305 from external data sources or system(s) 301 residing outside of DA system 300) that is streamed to an input connector is in a raw, unhandled format at this point in time. Examples can include, but are not limited to, XML data, stream-based data, text-based data (e.g., data from mainframe computers which were print into ACSII format, etc.). The input raw data can include a file containing hundreds or thousands of "events" (which can be considered as unstructured messages from which structured messages, discussed below, can be constructed) and can be stored together with initial metadata in an input queue (e.g., "in-queue" 325) (410). Below is a portion of an example of raw data 305 received by input connector 320.

```
<?xml version="1.0" encoding="UTF-8"?>
<documents>
  <document>
    <enteteTechnique>
      <jobId>EVCLI_EDITIQUE_1224669972275</jobId>
      <date_emission>1224669972275</date_emission>
      <application>SESST</application>
      <sequenceId>1</sequenceId>
```

```
    <distribution>
        <canal>http</canal>
        <pacific_emetteur/>
        <pacific_destinataire/>
        <pacific_reference/>
        <pacific_difup/>
        <pacific_profil/>
        <destination/>
        <serveur/>
        <model/>
        <copies>1</copies>
        <utilisateur>evcli</utilisateur>
    </distribution>
</enteteTechnique>
<gabarit nom="GAB_EVCLI_-----RDC_000004">
    <metaData>
        <lang>FR</lang>
    </metaData>
    <header>
        <account_title>BANQUE ETATS AFRIQUE
CENTRALE</account_title>
        <account_domiciliation>SEGPS/SRFO</account_domiciliation>
        <account_rib>
            <code_banque>30001</code_banque>
            <code_guichet>00064</code_guichet>
            <num_compte>00000051042</num_compte>
            <cle_rib>77</cle_rib>
        </account_rib>
        <account_iban>FR76 3000 1000 6400 0000 5104 277
</account_iban>
        <account_bic>BDFEFRPPCCT</account_bic>
        <account_nom1>BANQUE DES ETATS DE
L'AFRIQUE</account_nom1>
        <account_nom2>CENTRALE</account_nom2>
        <account_adresse1>BP 1917</account_adresse1>
        <account_adresse2/>
        <account_cp_ville>.. YAOUNDE</account_cp_ville>
        <account_country>CAMEROUN</account_country>
        <contact>SEGPS</contact>
        <date_production>13/05/2008</date_production>
    </header>
    <commun>
        <date_periode>13/05/2008</date_periode>
        <code_flux/>
    </commun>
    <detail>

<report>
                <num_page>1</num_page>
                <report_debit/>
                <report_credit/>
                <report_solde>999.999.999.999,99</report_solde>
                <a_reporter_debit>903.600,74</a_reporter_debit>
                <a_reporter_credit>0</a_reporter_credit>
                <a_reporter_solde>-903.036,68</a_reporter_solde>
            </report>
            <ligne>
                <detail_date_ope>13/05</detail_date_ope>
                <detail_date_val>13/05</detail_date_val>
                <libelle>OPERATIONS DIVERSES DEBIT</libelle>
                <detail_debit>999.999.999.999,99</detail_debit>
                <detail_credit/>
                <detail_solde>999.999.999.999,99</detail_solde>
            </ligne>
            <ligne>
                <detail_date_ope/><detail_date_val/>
                <libelle>NOTRE REF FT0733904544</libelle>
                <detail_debit/>
                <detail_credit/>
                <detail_solde/>
            </ligne>
```

The input queue is accessible by a document processing engine (e.g., formatting/rendering engine 310). Many suitable queuing mechanisms may be utilized. In some embodiments, the input queue may store each received data stream as a file (e.g., .xml, .log, .pdf, etc.). In some embodiments, the queued up raw input data can be read back from the input queue and analyzed by input agents or data agents (which are collectively represented by component 312 shown in FIG. 3) (415). These input agents are particularly configured for determining and handling different types of input formats, for example, XML, record stream, PDF, text pages, etc., using custom-developed configuration and handling.

For example, based on a configuration that an end user (which can be representative of an enterprise customer of DA system 300) has set up (e.g., via enterprise applications 350), an input agent can operate to pull data of a particular input format from the input queue and process the pulled (unstructured) data to find triggers (events) in the unstructured data (which is of the particular input format that the input agent is configured to process, for instance, a text input agent may operate to process unstructured text data in a text format such as .txt, .log, etc.). When an input agent identifies a known pattern (representing a triggering event) in the unstructured data (420), it can apply custom-configured logic (e.g., processing rules) (425) to the unstructured data to break it down and normalize the unstructured data into a format-independent data structure referred to herein as "message" (430). One example of a normalization process can be found in U.S. Pat. No. 7,127,520, which is incorporated by reference herein.

In this disclosure, the format-independent data structure, "message," is an internal binary representation of the input data. This internal (internal to DA system 300) binary representation allows information to be separated from layout and layout from format (e.g., XML, PDF, Word, HTML, etc.). This format-independent data structure is fully controlled by DA system 300. In the example of FIG. 3, DA system 300 would have full control of data in operations performed by formatting/rendering engine 310, between input connector 320 and output connector 330.

As an example, suppose raw data 305 includes an XML file containing tens of thousands of events (e.g., bills, invoices, purchase orders, contracts, statements, etc.). Each invoice, purchase order, contract, etc. can be identified, for instance, by a corresponding input agent utilizing a pattern matching technique. A document type may have a certain predefined pattern associated therewith (e.g., a contract pattern, an invoice pattern, a purchase order pattern, etc.). For example, an invoice may have an account number, an amount for the invoice, a due date for which the invoice is due, an address to which the invoice is to be sent, and a name to which the invoice is addressed, etc. In some embodiments, a sample of a pattern may be provided (e.g., by a customer from which an input data stream is originated and streamed to DA 300 for processing) and an input agent can be trained or configured to recognize the particular pattern in the raw data.

The input agent can be particularly configured to identify, per the document type, a triggering event that signals the beginning of an unstructured message (e.g., a bill) that was in the original data stream a trigger event that signals the end of the message, and any event in between (e.g., a customer's name, a billing address, a telephone number, an amount billed, a due date, etc.). At this point, a particular portion of data is isolated from the raw data and the system does not yet have any knowledge as to the layout, style, or format of the portion of data isolated from a (potentially huge) amount of data.

In some embodiments, the input agent (e.g., component 312) may operate to extract pieces of information from the isolated portion of the raw data and generate a message with the specific information of that invoice. In some embodiments, the input agent may apply particularly configured processing rules to the raw data, for instance, to identify a certain pattern representing a trigger event (e.g., a rule may specify that if "" is found in an input file, look for a set of metadata in "" and generate a message containing the set of metadata for ""). In some embodiments, rules can also be used to construct messages. For example, a rule may specify that if a first name is found in proximity of a last name in the unstructured data, then they should be put together as a name and stored in the message under the key or attribute "name." Additionally or alternatively, a message broker, such as one disclosed in the above-referenced U.S. Pat. No. 8,914,809, can be used to break down the raw data into the normalized structure and apply different rules to construct messages.

In DA system 300, such a message can be stored, together with custom metadata describing the message, in memory or in a data storage referred to herein as a message store (e.g., message store 360) (435). At this point, all the functions of DA system 300 are available to process messages stored in message store 360, regardless of data source(s) 301 from which the messages were generated.

In some embodiments, message store 360 can be particularly configured such that any downstream component (e.g., process formatting 314) can fetch data ("messages") from message store 360 based on metadata. Breaking down the raw data into messages allows documents to be assembled, put together in an efficient and intelligent way, utilizing data stored in message store 360 and/or data stored in document broker plus storage 370.

In some embodiments, a message can be stored as a row or entry in a database. In some embodiments, queue 325, message store 360, document broker plus storage 370, and/or out-queue 385 may utilize the same data storage mechanism (or document abstraction), for instance, one message per a row, one fragment per a row, one queue item per a row, etc., each with metadata attached thereto (e.g., for an invoice message, the metadata might include invoice number, delivery address, due date, etc. which can be completely customizable). The database can be queried using the same query language and multiple rows (associated with multiple messages) can be associated this way (e.g., "find all statements for account number=555").

In this disclosure, what constitutes a message can be customizable depending upon needs and/or applications and may vary from customer to customer (of DA 300). As non-limiting examples, a message can represent a bill, an invoice, a purchase order, a statement, a page, a report, a section of a page, a contract, a contract clause, etc. In some embodiments, the header information in raw data 305 can be used to determine applicable output channel(s) (e.g., an HTTP channel) and use that information to determine how the final output should be rendered and delivered.

Using the sample portion of raw data 305 received by input connector 320 provided above as an example, a message may correspond to an isolated <detail> portion, an isolated  portion, or an isolated <report> portion. The database row for the message would contain the data extracted from the corresponding isolated portion and a pointer that points to the actual data (which, in one embodiment, can be persisted, for instance, in a directory or file system, after it has been processed by component 312).

In some embodiments, messages (normalized data) can be read from message store 360 and processed by one or several processes (which are collectively represented by component 314 in FIG. 3) based on custom configuration(s) (e.g., via enterprise application(s) 350) (505). In this disclosure, a process refers to a document configuration/service that transforms message data into formatted data.

As a non-limiting example, a process performed by component 314 could involve a designer using a Design Center or StoryTeller tool to create a document layout (e.g., in a custom project of enterprise application 350) where the designer decides what image or video or text should be where in a document, whether a table or a chart should be included and where it should be placed, what line should be drawn where, what logo to use and where to place it, etc. In this way, a template can be dynamically built based on the (normalized) input data. It could also involve aggregating information for a specific customer account, for instance, all the order information needed to fill a table. It may include calculating the data (e.g., running scripts calculating a due date as "today plus 30 days," calculating a payment amount, etc.). It could include getting additional facts from external systems. Enormous potential at this stage to extend the (message) normalized data into formatted data with even more information and enrich dynamic documents such as HTML5, JavaScript, etc. Component 314 may operate to tie a message to certain formatting and/or layout information/instructions. Virtually an unlimited number of processes (e.g., page formatting, print optimization, etc.) may be added and the user can query message store 360 for desired information (e.g., fetch all accounts that are in the Northwest region). Some processes may be purely data-driven and some may produce template-based outputs. This unprecedented processing flexibility is possible because details about the look and feel of all the data thus formatted are known to and controlled by DA system 300. For the sake of convenience, "fragment" is used herein to refer to formatted data.

Formatted data could be anything from fully formatted page/unpaged output (documents) to XML, HTML and record-based stream output. Fragments of documents (formatted data) created by the processes are still not the "real" documents since the "rendering" has not yet been done. This means that the formatted data being processed is still in a presentation-independent format fully controlled by the DA system. The formatted data may be checked for uniqueness (discussed below) and stored together with custom metadata (meta information) in a fragment storage (e.g., document broker plus storage 370) (510). Such custom metadata can include any formatting, style, and/or layout information such as placing a text field at the upper left corner of a document, adding a watermark on a specific page, including a specific contract clause or a claim type in the document, adding an image at the bottom of a window, applying a color to a logo position to the upper left corner of the document, adjusting the size of the window, using a particular style of a table in the document, preparing the document for a laptop or a mobile phone, etc. Skilled artisans appreciated that these non-limiting examples are meant to be illustrative and that other use cases may be possible to store document fragments and their references to resources.

To illustrate a difference between messages (normalized data) stored in message store 360 and fragments (formatted data) stored in document broker plus storage 370, consider a use case in which a billing address is changed and a use case in which a new account is added to the billing address. For the first use case, an authorized user (e.g., a user of enterprise application 350) may access message store 360 to query any message containing the billing address and update the billing address accordingly. For the second use case, the same or different user may access document broker plus storage 370 and query all account levels associated with the billing address and generate a single bill for the billing address, with the new account added to the bill.

In some embodiments, the same message containing the billing address can be used in both use cases, but for different purposes. In some embodiments, a message only needs to be stored once and can be used and reused virtually unlimited times for various reasons. In the second use case, a fragment stored in document broker plus storage 370 can add another layer of abstraction to the message, which is stored in message store 360.

Note that a one-to-one relationship between a message stored in message store 360 and a fragment stored in document broker plus storage 370 is not required. For example, a fragment (which may contain format, style, and/or layout information, rules, and/or instructions that can be used or consumed by a downstream component such as driver or "renderer" 318) may be constructed using multiple messages stored in message store 360 and a message stored in message store 360 may be used by multiple fragments stored in document broker plus storage 370.

In some embodiments, messages can also be stored (as part of some fragments) in document broker plus storage 370. In some embodiments, instead of being physically incorporated, the fragments may reference the messages (e.g., a fragment may reference one or more messages).

In some embodiments, DA 300 can be optimized to store each message only once. For example, a company's logo would only need to be stored as a unique message once and the message can be included in all of the documents generated for that company. In some embodiments, message store 360 may allow for duplicate messages to be stored therein.

A message stored in message store 360 does not have any format, style, or layout information. In some embodiments, additional information (e.g., sizes, colors, styles, fonts, etc.) relating to the presentation of a "document" (yet to be assembled and rendered) can be added by component 314 and/or component 316 and then rendered by component 318.

In some embodiments, formatting/rendering engine 310 may receive presentation information (e.g., document themes, for instance, branding, seasonality, environmental-friendly look and feel, etc.) through common asset services 380. In some embodiments, common asset services 380 may provide other types of information, for instance, data for premium service subscribers versus data for standard service subscribers, data for different geographic locations, etc. In some embodiments, a new row in document broker plus storage 370 (a fragment) may be created by querying message store 360 (to obtain relevant message(s)) together with a set of rule(s), and perhaps adding information received via common asset services 380. At this point, the fragments still do not resemble the final documents.

In some embodiments, DA 300 can be optimized to store each fragment only once. This can be done, for example, via programmatic logic 345 particularly configured for determining, prior to storing a fragment in document broker plus storage 370, whether the fragment is unique (and has not been seen by programmatic logic 345 before). In some embodiments, programmatic logic 345 may be implemented as a part of component 314 and of a store layer that stores an outcome (formatted data) from component 314 in document broker plus storage 370. In some embodiments, programmatic logic 345 may be configured for applying a hash function to a fragment to generate a hash and compare the hash with hashes stored in a hash table or some data structure to determine whether an identical fragment already exists in document broker plus storage 370. As a non-limiting example, programmatic logic 345 may apply a cryptographic hash function to a fragment to generate a checksum. Prior to storing the fragment in document broker plus storage 370, the fragment's checksum can be compared with one that was previously generated for another fragment that had already been processed and stored in document broker plus storage 370. If the two checksums agree, there is no need to store two copies of the same fragment.

Such a mechanism can also be used to check for authenticity. For example, in some embodiments, programmatic logic 345 may include a security mechanism in which a cryptographic function can be applied to a fragment or a set of fragments (e.g., a row or multiple rows in document broker plus storage 370 associated with a document or a section thereof) to generate a signature for the fragment or the set of fragments. The signature can be stored with the fragment or the set of fragments so that, on retrieval, it can be used to compare with another signature generated at output time. If there is no difference in the signatures (or the checksums), the digital signature (or checksum) can serve as proof that the fragment or the set of fragments is genuine and had not been altered.

As the amount of documents under processing can be in the millions, such an efficient storage mechanism can significantly reduce the amount of data storage required. As the operation of formatting/rendering engine 310 progresses downstream (e.g., for a processing job), more layers of abstraction can be added to produce different types of documents and various versions thereof, as further explained below.

In some embodiments, fragments (formatted data) can be read from the fragment storage (e.g., document broker plus storage 370) and further processed based on custom configuration used by one or several post formatting components (which are collectively represented by component 316 in FIG. 3) (515). For example, post formatting component(s) 316 may run the retrieved formatted data through one or more transformations into a final document, making sure that resources are correctly organized, fonts are embedded in the file format, getting an image or video where needed, the final format is the correct format (e.g., for mailing, emailing, printing, faxing, or any output channel), the final size is the correct size, the resolution is appropriate for the output channel, and so on. In some embodiments, the output from post formatting component(s) can be passed directly to a driver or renderer (which is represented by component 318 in FIG. 3) that renders the formatted document into the final form/size (520). In some embodiments, the output from component 316, which can be even closer to the final output than fragments, may be stored in yet another data storage (not shown in FIG. 3). In some embodiments, the driver may render the output from component 316 into a device specific format (e.g., PDF, PCL, AFP, PS, DOCX, HTML, Barcode printer formats, etc.). The final stream is stored together with custom metadata describing the rendered, finalized data (e.g., rendition 395) into an output queue (e.g., out-queue 385) (525).

In some embodiments, the finalized data can be read (e.g., by output connector 330) from the output queue and delivered via configured output delivery channel(s), for instance, to device(s) 309 using appropriate connectivity methods and protocols (e.g., to a postscript printer via a custom output connector for the postscript printer), as those skilled in the art can appreciate.

As discussed above, the normalization and formalization into a final output can be processed in several steps. The "process" (or job) can be restarted at any point of the storage steps and there could also be possibility to merge data between the different steps based on configuration and metadata. This provides DA 300 with capabilities to change/reformat/re-render the document based on custom logic and changes.

Figure 6A:
Figure 6B:

FIGS. 6A-6C depict diagrammatic representations of example versions of a document rendered from fragments augmented with rich information. As illustrated, rendered documents 600, 601, and 603 represent billing statements for different customers of a company. Digital documents 600, 601, and 603 have a similar look and feel and are enriched with various features that can improve user experience. For instance, documents 600, 601, and 603 all have "Pay Now" button to encourage fast payment. However, documents 601 and 603 are missing section 610 where certain information shown in document 600 is blocked from view.

Because these documents are assembled from fragments as described above, the system can intelligently and dynamically determine that viewers of documents 601 and 603 do not need to view this section and block out section 610. The missing data (e.g., in a blocked out section) is not lost, just hidden from those who are not supposed (e.g., not relevant or not authorized) to view the missing data. The system has the ability to white out or black out or replace or re-arrange the information and layout when re-rendering. There could be various reasons for rendering/re-rendering a document into different versions. For instance, the system may determine that a type of output device or a target device for document 603 does not support videos and replace a video with an image when rendering document 603.

Figure 6D:

In addition to rendering a document in different formats (e.g., PDF, docx, HTML, AFP (Advanced Function Printing), etc.) tailored to various output devices, the system can render a document in different formats tailored to different viewers (e.g., "person with bad eyesight on a tablet." or "people over 70 get a bigger font."). This can be done by enabling/disabling a section/feature associated with a fragment. For example, an audio readout function may be embedded to read out the text in a particular section. This has a technical effect of eliminating the need to read out the entire document when only a portion may be needed or important to a user. Furthermore, the system may embed an electronic version of data (XML) targeted for automated systems such as one used in a vehicle. Different users of different roles may place different fragment(s) in a section and/or modify different sections of a document for various reasons. For example, as illustrated in FIG. 6D, a first user from the accounts payable user group may be responsible for section 620 which shows an account balance and payment information; a second user from the billing department may be responsible for section 630 which shows the billing information and timeframe; and a third user in marketing may be responsible for adding a promotional video in section 640. As explained below, whether a user can view and/or edit a fragment in a section of a document may depend on that user's role relative to that section, as specified in an access control list (ACL) for that section. Another feature is that a signature (which can be generated using any suitable signature generation technology) may be embedded in the document to guarantee that the included content is authentic.

In this way, the system can provide customized layout and information based on rules/roles and easily change content and re-render (e.g., due to a new logo, new font, new legal text, new company address in a footer, etc.). Because the system has full control and knowledge of the fragments and how they are used, the system can perform analytics. Example analytics may include computer operations to analyze performance and utility of fragments in various scenarios. For instance, how many times a fragment is used to produce how many documents within a period of time. Some analytics may focus on user behavior (e.g., who a user is and how that user views the documents). This ability can be applied to invoices.

The system can generate a document definition of a document genus. This document definition includes information on the different fragments of the document genus, and may include configuration information such as an arrangement of the fragments. A document definition can include indication of a subset of fragments that are required in each document version, as well as those that may be left out or "blanked out." For example, a fragment containing a function to drill down on financial information may be used in a desktop version, but not in a mobile client version.

The configuration information contained in a document definition may include references or links to certain fragments. As described above, a document may not be "finalized" until during a rendering process, which may include determining which fragment (i.e., a final image) to include in the document, based on the device type, user role, context, etc.

The document definition feature has utility over the "lifetime" of a document. For example, document authors may need or desire that four essential parts of the document be included and rendered in each document version of the genus. However, another part of the document may be solely dependent on a specific time/date, so it only needs to occur in a species version of the document. In this example, the document definition can be used to render the document, each time guaranteeing that the four essential pieces (representative fragments) are included, but not necessarily the one time-specific fragment.

Essentially, a fragment is stored once and used many times at rendering time. This has a technical effect of allowing the system to store documents in an extremely efficient manner. To illustrate, FIG. 7A depicts a diagrammatic representation of an example document in a conventional archive format. Suppose document 700 has a size of 240 KB in a rendered format (e.g., TIFF). In this example, the 240 KB file size is due to some media files (e.g., ad image 710, interactive graph 715, ad image, 720, and video 725) included in document 700. Without having to actually include these images, document 701 of FIG. 7B is only 44 KB—a 5.5 times saving in storage space. With the improved DA disclosed herein, a system can break a document design down into fragments and store the fragments in the internal binary representation and corresponding instructions need to take the fragments and render them in a representation according to a layout (e.g., invoice 730). This is a substantial saving in storage space and can be particularly advantageous in a cloud computing environment due to the relatively expensive cost of cloud storage.

Similar to FIGS. 6A-6D described above, the system may render these documents to suit different roles, devices, rules, or even network connectivity and/or bandwidth. For example, when the system detects that a network connection is sufficient for a full bandwidth rendition, the system may render a rich document 701 that is assembled from fragments enriched at rendering time with various features such as ad image 710, interactive graph 715, ad image, 720, and video 725. Additional features may also be added, for instance, charts, chap app, etc., at rendering time. Alternatively, as illustrated in FIG. 7C, the system may render document 703 with no image data such that the system can perform better when the bandwidth is low.

Figure 8:
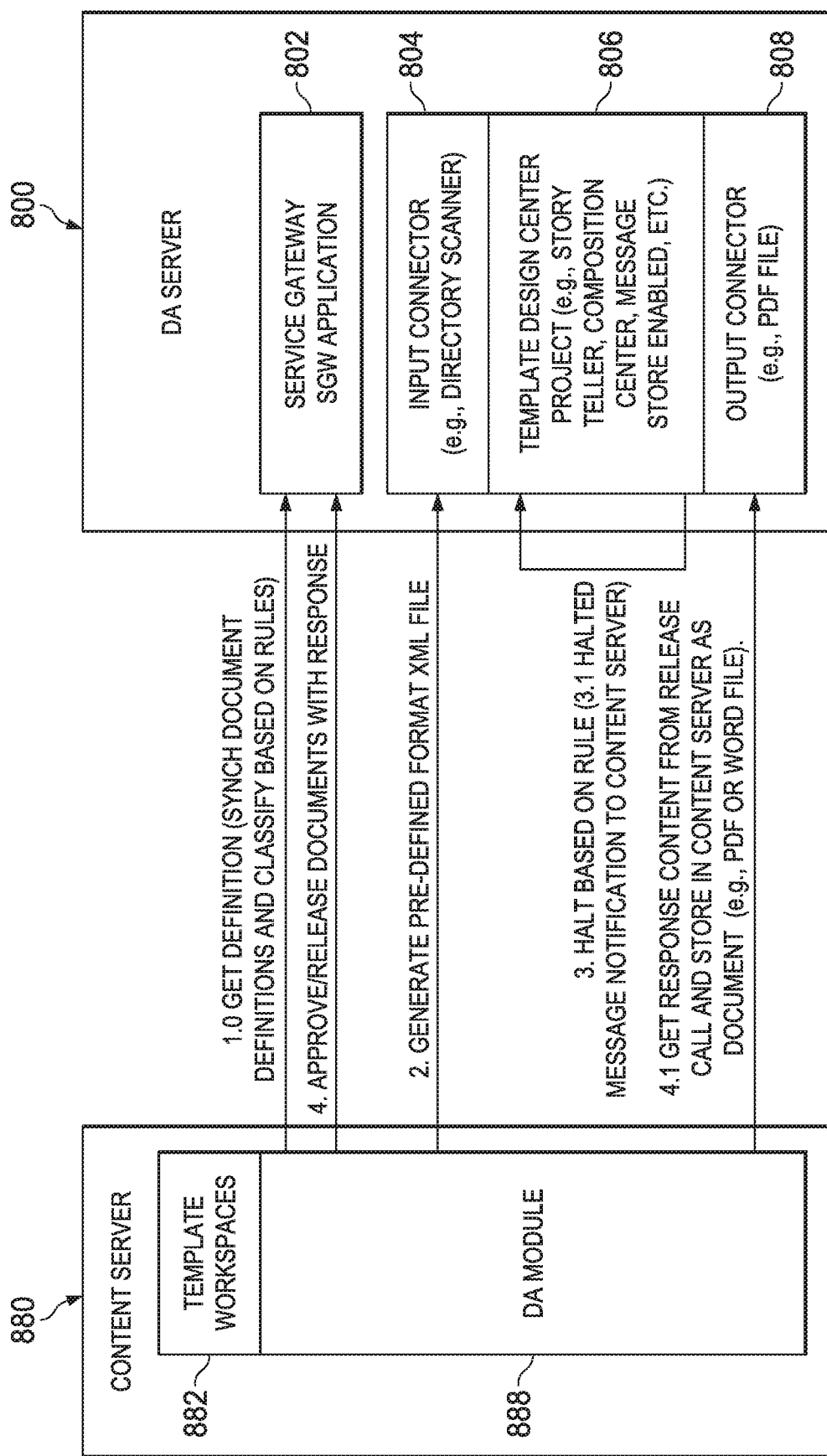
FIG. 8 depicts a diagrammatic representation of an example integration of a content server and the document architecture disclosed herein according to some embodiments.

In some embodiments, the DA described above can be integrated with one or more commercially available enterprise systems (e.g., enterprise applications, third-party applications, etc.). FIG. 8 depicts a diagrammatic representation of an example of integrating content server 880 and DA server 800 according to some embodiments.

In the example illustrated in FIG. 8, content server 880 may provide template workspaces 882 where a user can define/design templates of document types. Content server 880 may support integration of message-based documents and user interface (UI) integration of Ad Hoc Editor for generation of document definitions. New DA application programming interfaces (APIs) may allow DA module 888 running on content server 880 to communicate with components of DA server 800 (e.g., service gateway (SGW) application 802, input connector 804, and output connector 808). For example, DA module 888 may communicate a document definition from content server 880 to SGW application 802 (which, in one embodiment, may run at the application layer as enterprise applications 305 shown in FIG. 3). In some embodiments, input connector 804 may operate the same or similar way as input connector 320 described above; component 806 may implement an embodiment of document processing engine 310 described above; and output connector 808 may operate the same or similar way as output connector 330 described above. However, in this example of integration, these components may be particularly configured to work in concert with content server 880. For example, input connector 804 may be particularly configured for scanning a directory or repository that is managed by content server 880; component 806 may be configured with rules specific to content server 330 (e.g., as illustrated in FIG. 8, processing by component 806 may be halted based on a rule associated with content server 880); and output connector 808 may be particularly configured for communicating outputs from DA server 800 to content server 880 (or to a directory or repository managed by content server 880).

In this way, the DA APIs can facilitate the control of Ad-Hoc generation of documents, creating, reading, and releasing. A user (e.g., a content server user working with an Ad Hoc contract document) may wish to re-generate an old contract because some information (e.g., a legal clause) has changed since it was originally created.

In some embodiments, the system can highlight to an end user (e.g., a recipient of the contract) of the changed information. New versions of the contract can be stored, by the content server) in a data storage (e.g., storage device 309 shown in FIG. 3) managed by content server 880 for all affected documents and events and analytics on changes can be made. Such regeneration may also be referred to herein as smart re-rendering. Smart re-rendering is further explained below.

Figure 9A:
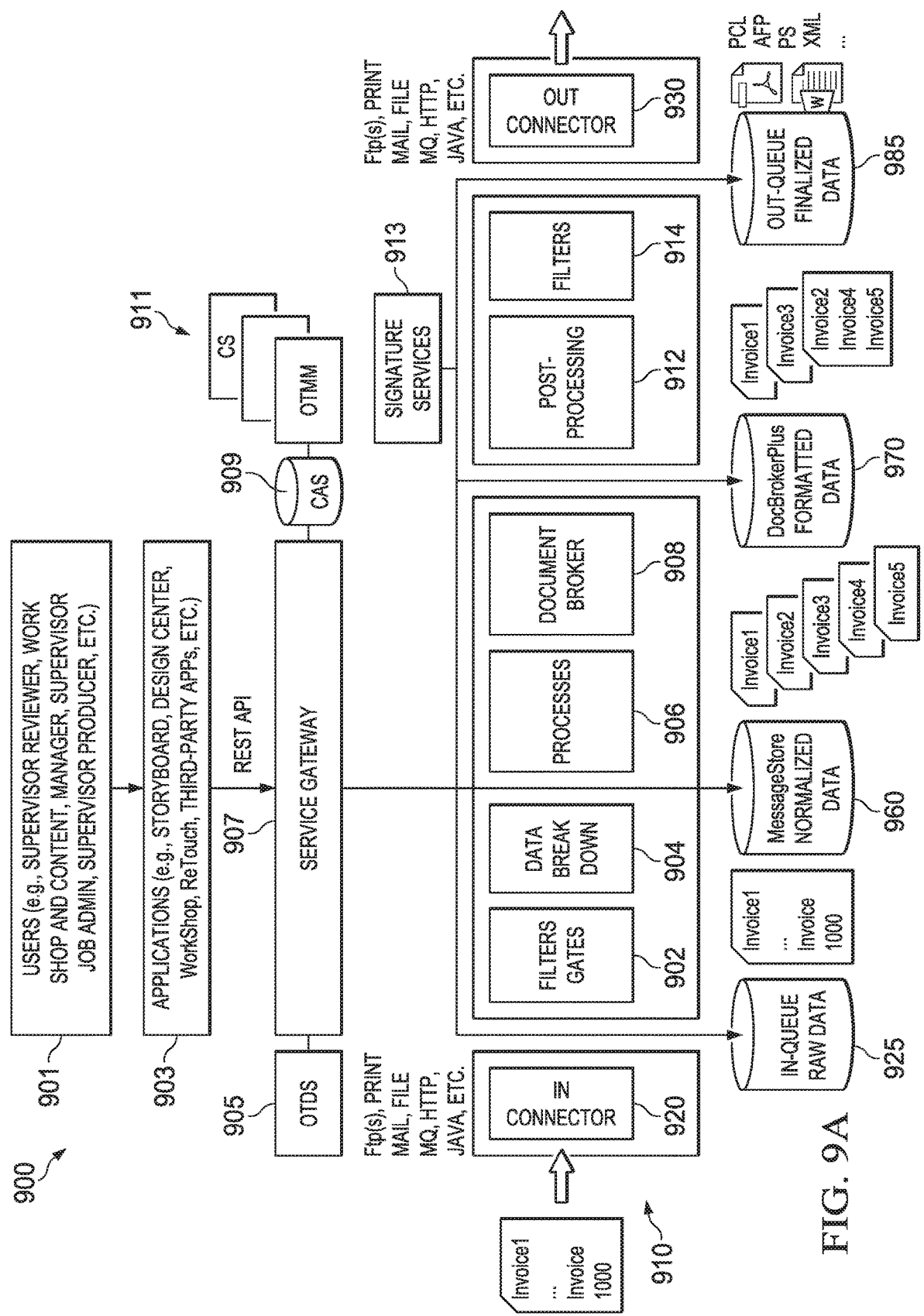
FIG. 9A depicts a diagrammatic representation of another example document architecture according to some embodiments.

Skilled artisans appreciate that embodiments of the DA disclosed herein can be implemented in many ways. FIG. 9A depicts a diagrammatic representation of another example DA according to some embodiments. DA system 900 may be similar to DA system 300 described above.

In the example of FIG. 9, DA system 900 may be communicatively connected to client devices over a network. Hosted services (e.g., Open Text Directory Services (OTDS) 905, common asset services (CAS) 909, document asset services (DAS), etc.) and resources (e.g., CAS resources, templates, etc. which, as illustrated in FIG. 9A, may be managed by information management system(s) 911) may be accessible over the network by these client devices via service gateway 907. Various types of users 901 may have various types of applications 903 running on their devices. These applications may communicate with DA system 900 via a public REST API to service gateway 907. Similar to DA system 300, DA system 900 may include formatting/rendering engine 910 that has full control of data in operations performed between input connector 920 and output connector 930.

In some embodiments, formatting/rendering engine 910 may include components similar to those of formatting/rendering engine 310 described above. For example, subcomponent 902 may read raw data from in-queue 325, use filters to identify data of interest (e.g., invoices 1 . . . 1000) from the raw data (e.g., a file streamed to DA system 900 via input connector 920) and have subcomponent 904 breaking down the data of interest (e.g., into individual invoices 1 . . . 1000) to generate messages that can then be stored in message store 960, similar to the functionality of component 312 described above.

The stored messages can be read by subcomponent 906 (which, in this example, comprises a plurality of processes) and processed by document broker 908 into formatted data (fragments representing messages augmented with additional information such as layout information, format information, style information, print optimization, etc.). The fragments can be stored (e.g., by a programmatic logic similar to programmatic logic 345 described above) in document broker plus storage 970. As described above, there need not be a one-to-one relationship between messages stored in message store 960 and fragments stored in document broker plus storage 970. For example, a fragment stored in document broker plus storage 970 may reference multiple messages (e.g., representing invoices 3-5 in the example shown in FIG. 9A). In some embodiments, only unique fragments are stored in document broker plus storage 970. This can be achieved by utilizing a programmatic logic similar to programmatic logic 345 described above.

In some embodiments, fragments stored in document broker plus storage 970 can be read by post processing 912 and various filters 914 may be utilized to assemble or otherwise prepare delivery-ready documents and/or variations of documents which, as illustrated in FIG. 9A, can be stored in out-queue 985. In some embodiments, signature services 913 may be utilized to provide an additional security measure. For example, signature services 913 may generate a signature for a fragment (or a set of fragments) and compare the signature with the one stored with the fragment (or the set of fragments). If the two signatures agree, this means that the fragment (or the set of fragments) has not been altered during processing by formatting/rendering engine 910.

According to one embodiment, when a document is assembled, document data for the document can be stored in output queue 985 that includes pointers to all the fragments that were assembled to make up the document. In addition, signature services 913 can generate unique signature for the assembled document, which may be a signature of all the content that makes up the document. Signature services 913 can store the signature in the document data for the document. The system may also store a copy of the rendered document (e.g., if the document is a .pdf document, the system stores a copy of the .pdf).

During archiving, DA system 900 can analyze the document data, identify all the discrete pieces of content that make up the document and archive the document frame, discrete pieces of content, signature and/or a copy of the rendered document. The document signature can be used at a later date to verify the document content or copy of the rendered document has not been altered.

Figure 9B:
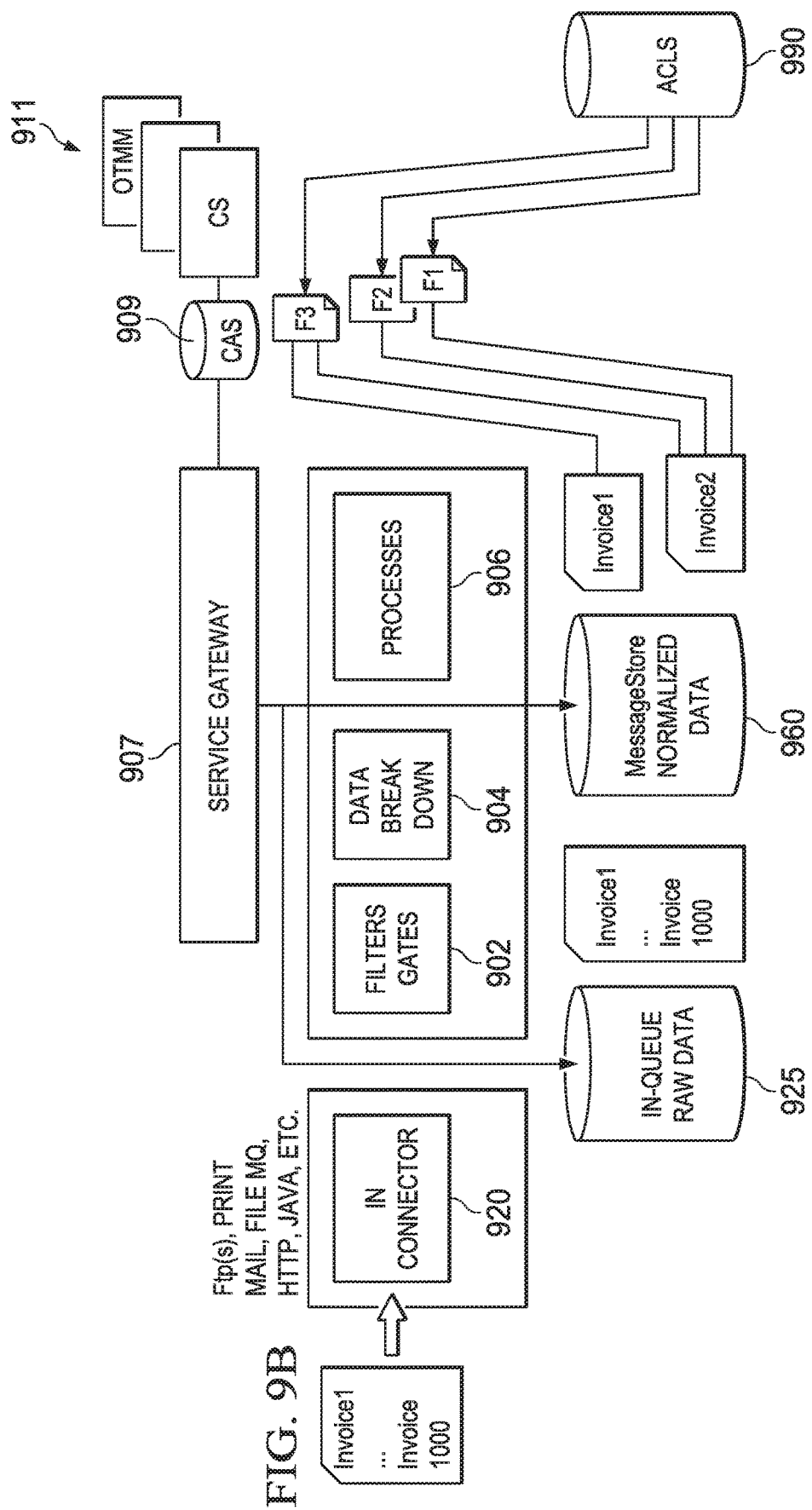
FIG. 9B depicts a diagrammatic representation of a portion of the example document architecture of FIG. 9A with additional details.

FIG. 9B depicts a diagrammatic representation of a portion of DA system 900 of FIG. 9A with additional details. As described above, a system implementing the DA disclosed herein has full control of messages stored in the message store. These messages can be augmented, extended, or otherwise refined with additional information/instructions and stored as formatted data (fragments). In some embodiments, such fragments may be stored in CAS 909 and referred to as CAS resources.

As illustrated in FIG. 9B, fragments (e.g., F1, F2, F3) can be retrieved from CAS 909 and used to assemble documents based on instructions associated therewith. As described above, a message can be created once and used multiple times. Likewise, a fragment can reference one or more messages. In this example, a message (Invoice 2) is referenced by multiple fragments and a fragment (F3) references multiple messages (Invoice 1 and Invoice 2). A document may be assembled using one or more fragments. After the document is assembled, the system invokes a driver/renderer to produce an output (e.g., a version of the document) in a desired format. Whether a section of the document that contains one or more fragments is rendered as read-only or editable may depend on an ACL associated therewith. Further, during rendering, a fragment may be included in a section or excluded from a section, depending upon whether an intended recipient of the document has at least a view permission as specified in an ACL associated with that section. Such an ACL may be retrieved from ACLs data storage 990.

Embodiments of a new and improved DA disclosed herein can provide many advantages. For example, as described above, at input time, a DA system can break down raw data into pieces (messages), separating information and layout and separating layout and format (e.g., PDF, Word, HTML, etc.). These pieces are processed and stored as fragments (also referred to as document fragments). Fragments are not limited to pieces of content and can be re-purposed as needed. For example, they can be used for functions such as readout. A screen reader can read the important and/or interesting parts of a document. Further, a customer can, via self-service, choose if he wants just the totals or more info and actions to be performed; e.g., "book" and "pay"). The parts (document fragments) may or may not actually be visible on the screen. This is a different way of presenting a document.

Further, the DA system can perform analytics on fragments and understand how the fragments (e.g., legal clauses, promotions, images, tables, graphs, etc.) are used, as well as how users work with the information. The DA may generate a report with role-based drill downs and summaries showing results of the analytics.

Additionally, the DA system can perform a single instance storage on all fragments, which is much more efficient. Content and instructions are stored only once, significantly saving storage space. The efficient storage feature allows the DA system to be highly scalable, for instance, scaling from 100 plus customers generating over 100 million documents a year to 3000 plus customers generating billions of documents per year. This storage saving feature can be especially important in a cloud implementation as cloud storage can become expensive quickly.

With signatures, the DA system can confidently guarantee that content is the same (authentic) and has not been altered during processing. For example, all invoices produced by the DA system contain the same fonts, images, etc. This security feature can be important for (efficient long term) storage (or archive). For instance, invoices may have to be stored for years. With the DA system described herein, these invoices can be stored in parts in association with their "importance" and reassembled, when needed, with proof that they have not been altered over the years.

At output time, the DA system allows for augmentation of rich data (e.g., tables, graphs, etc.) based on the raw data received by the DA system. That is, the DA system can inject intelligence around the outputs, add rich information (e.g., summary, images, etc.) and/or functionality (e.g., role-based drilldown, "pay it now" button, etc.) when rendering, intelligently remove details (e.g., white out, black out, replace, re-arrange the information and layout, etc.), annotate (e.g., in .pdf outputs for screen readers/vice), embed electronic version of data (e.g., .xml) targeted for an automated system (e.g., in a vehicle) or voice version.

Benefits and advantages provided by this smart rendering feature can include, but are not limited to, dynamically re-rendering a document in different formats (e.g., .pdf, .docx, .html, .afp, etc.) tailored for specific devices and/or persons (e.g., "person with bad eyesight on a tablet" or "people over 70 get a bigger font." In the past, such documents are pre-generated one page at a time.

Smart re-rendering can be performed with customized layout and information based on rules/roles. For example, alternative images or graphs can be included so that the outputs would look good for all recipients and devices. Further, white spaces and/or blackout areas can be appropriately managed (e.g., by arranging the fragments differently from version to version of the same document) so that information presented on each version of the document is adapted seamlessly. Skilled artisans appreciate that the smart rendering/re-rendering feature may work on offline documents (e.g., in a non-streaming environment). A user can simply change content and re-render (e.g., with a new logo, new font, new legal text, new company address in footer, etc.). Since the DA system owns the intermediate formats used by the document processing engine, the DA system can avoid data loss or fidelity loss.

Figure 10:
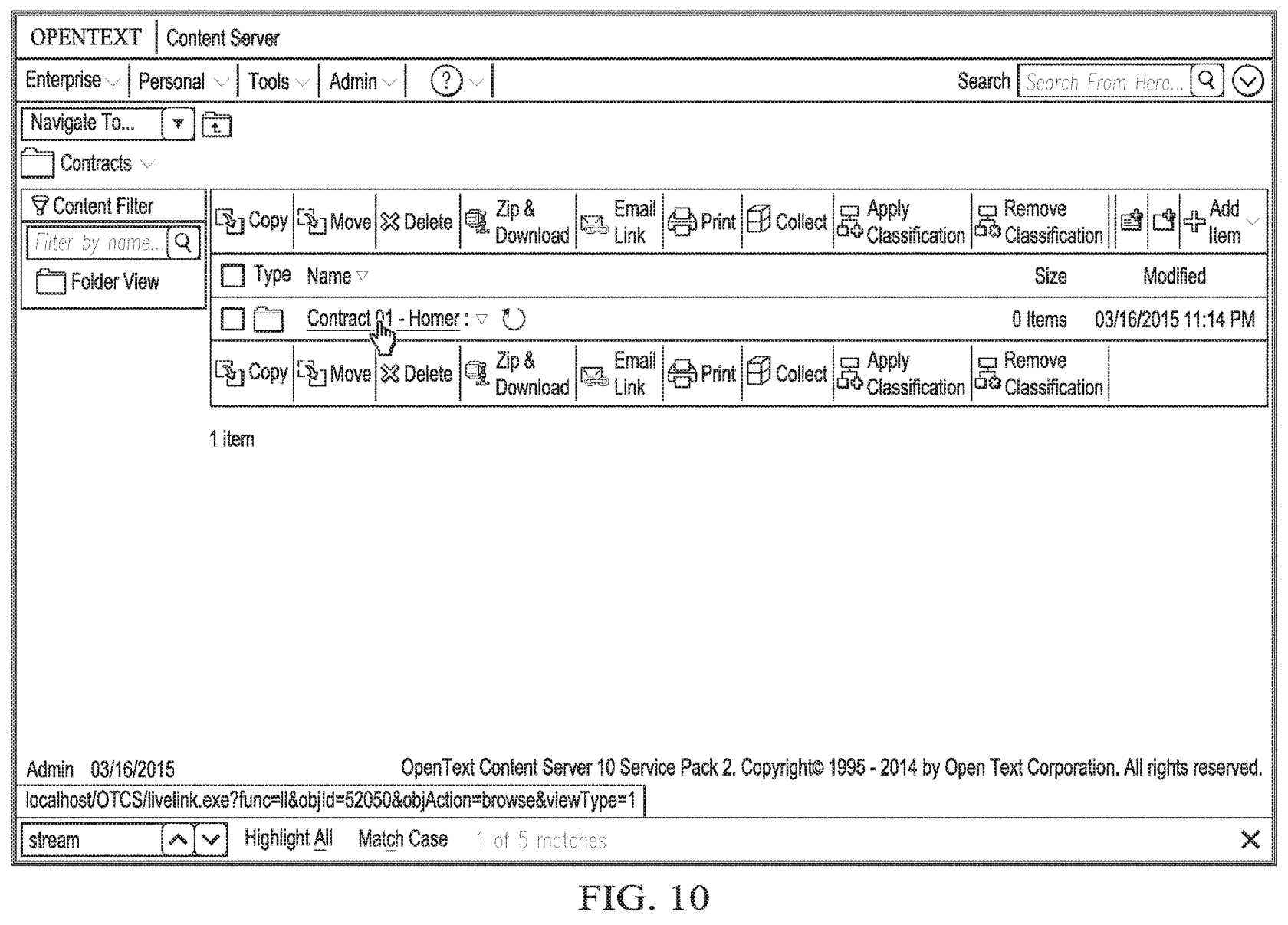

FIG. 10 depicts a diagrammatic representation of a user interface of an example of a content server integrated with an example of the document architecture disclosed herein according to some embodiments. This example use case shows that a user is accessing a folder "Contracts" managed by the content server to create a new contract for "Homer" within a subfolder "Contract 01—Homer."

FIGS. 11-23 provide examples of user interactions with the content server of FIG. 10 according to some embodiments. An end user of the content server does not directly interact with the underlying DA. Yet, the content server can use user-provided details to control the document fragmentation process (by a document processing engine of the DA) described above.

Figure 11:
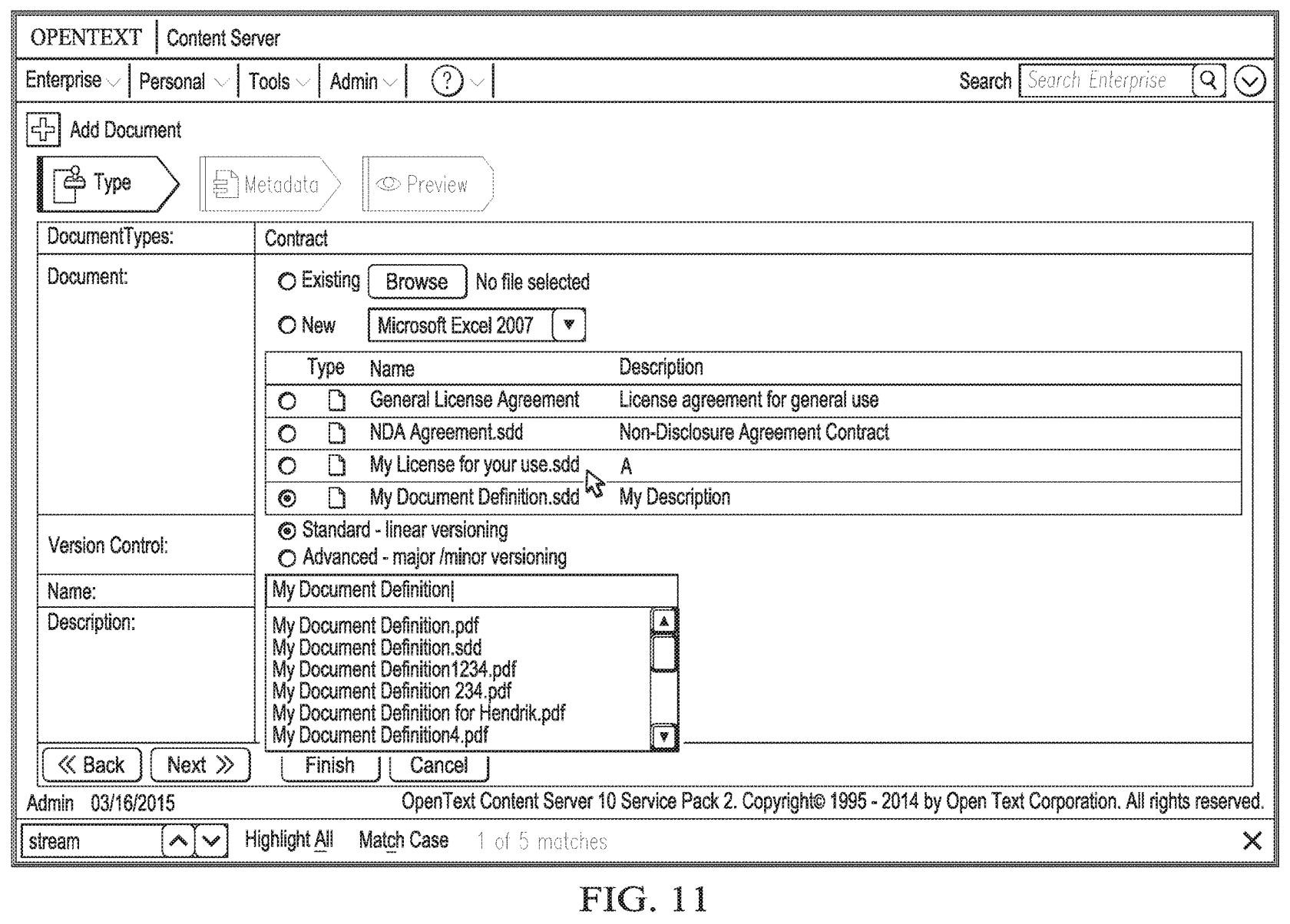

To create the new contract, the user may navigate to an add function that allows the user to access a document definition (which, in this case, is a custom one created by the user) of a particular document type. This is illustrated in the example of FIG. 11.

Figure 12:
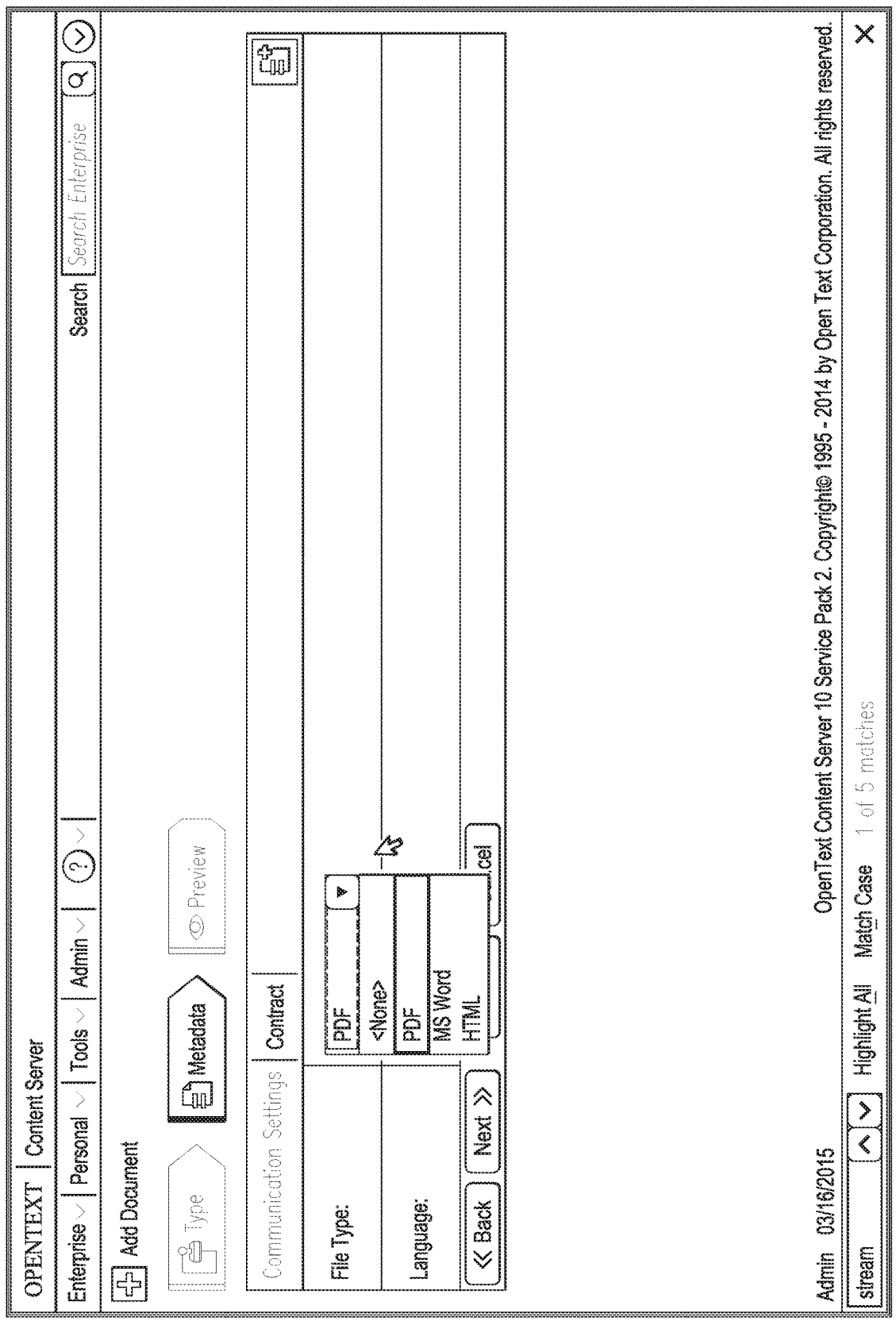

FIG. 12 shows that the user can provide metadata (e.g., file type, language, etc.) for the new contract. In this case, a piece of metadata indicates that the new contract should be in PDF.

Figure 13:
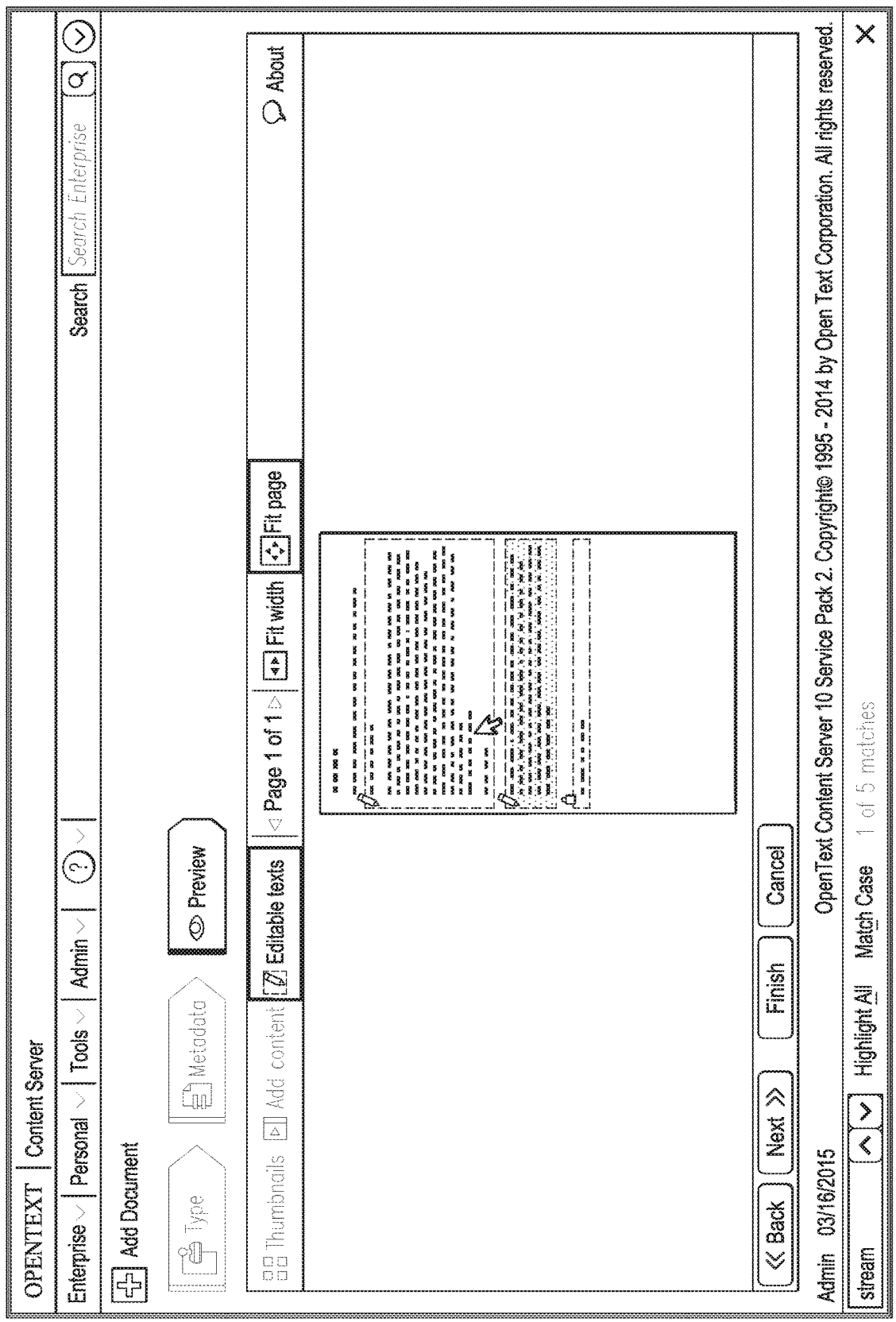

FIG. 13 shows a definition of fragments, which are stored in an internal format by the DA and which can be viewed and edited by users of the content server. One fragment shown in FIG. 13 is locked. As described above, if a user does not have an appropriate permission (e.g., based on the user's role and defined in an ACL associated with the fragment) to edit or alter a fragment, the fragment can be locked so that the user cannot edit or alter it.

Figure 14:
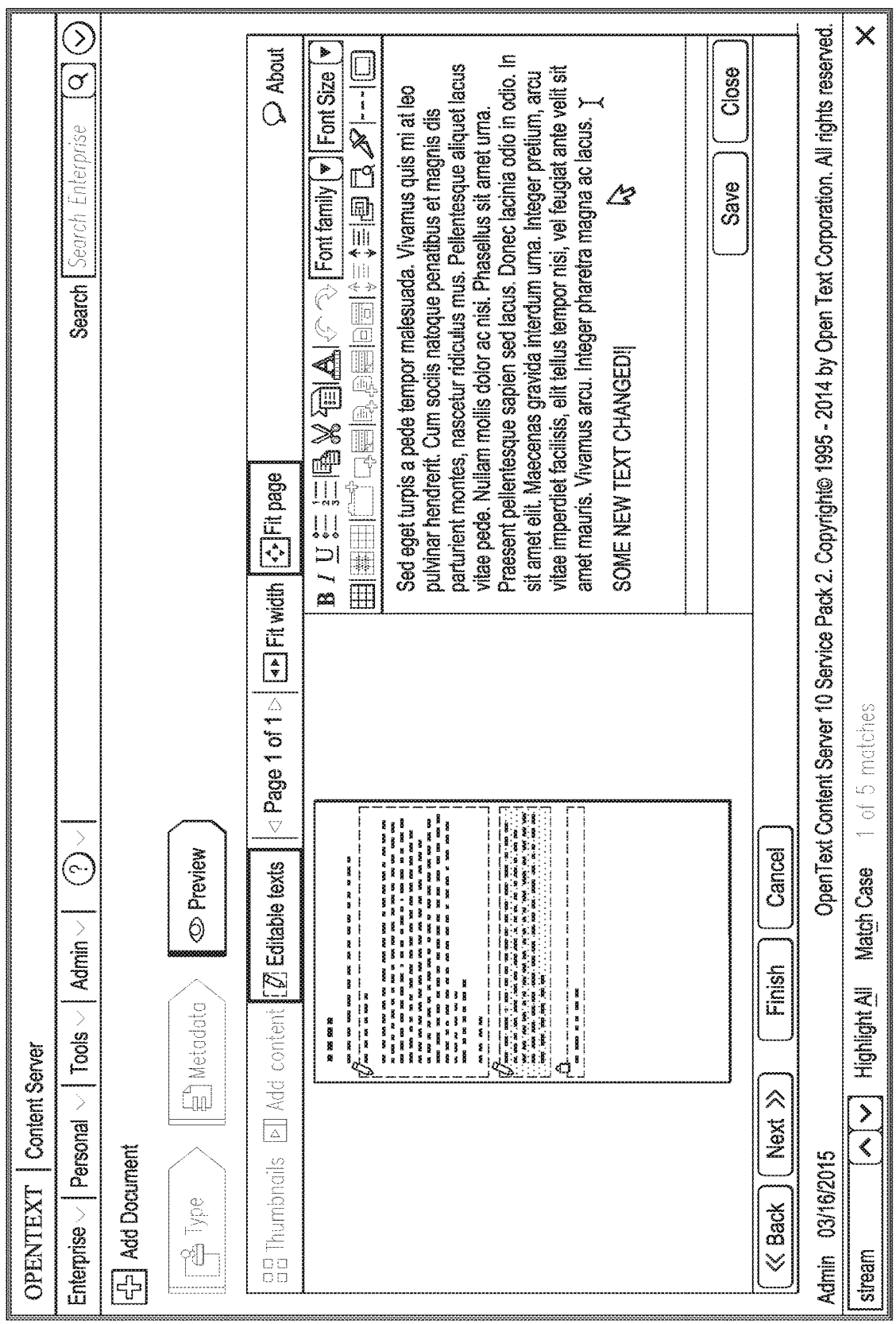

For a fragment that can be edited by the user (because the user has a proper permission to do so), FIG. 14 shows an example in which additional information can be added to the fragment by the user. As illustrated in FIG. 14, the user interface of the content server is provided with several functions that allow the user to alter not only the text for a fragment, at the fragment level, but also the look and feel of the document, at least at the page level (e.g., "Fit width," "Fit page," etc.).

Figure 15:
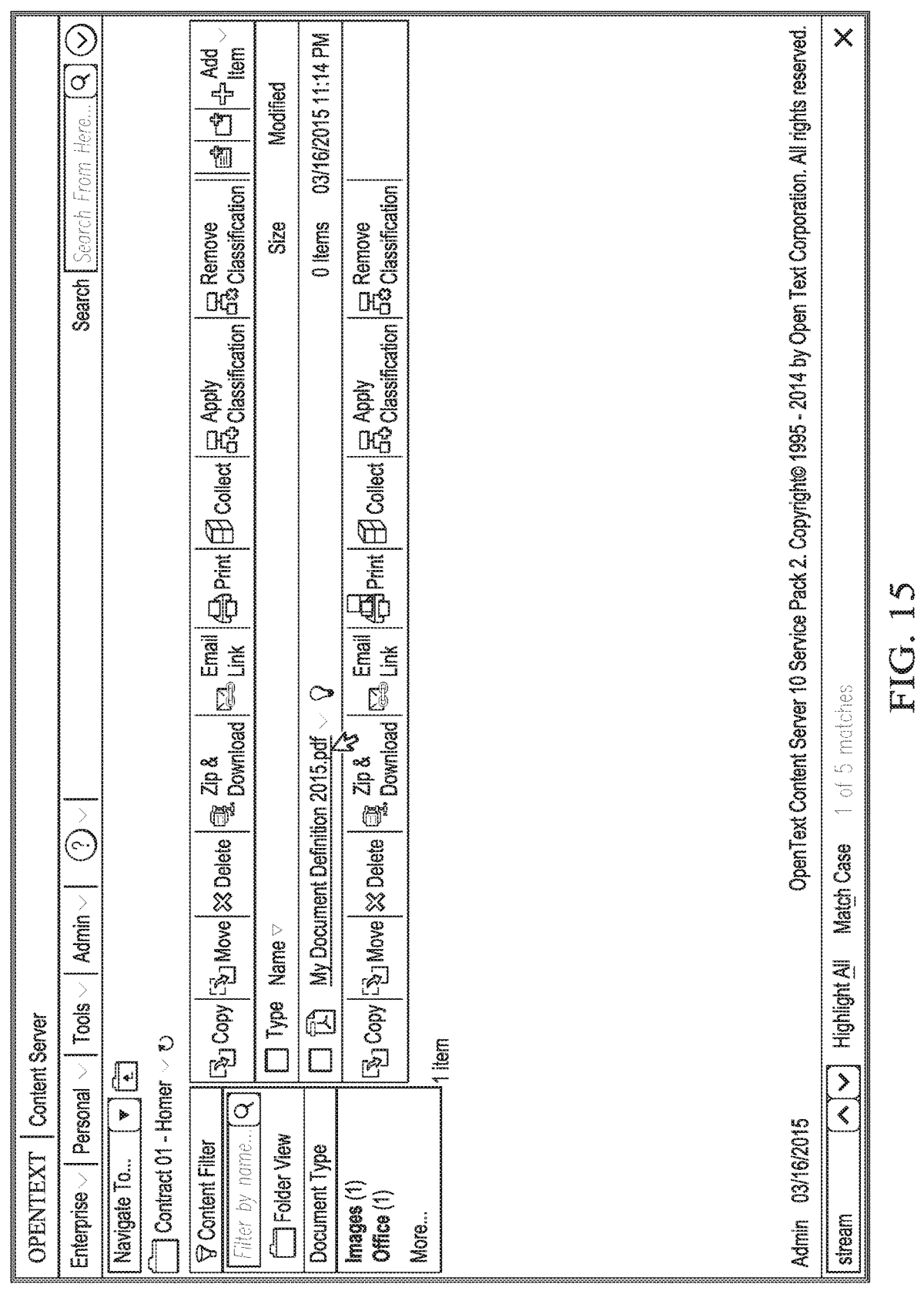

When the newly created "document" ("My Document Definition 2015.pdf") is saved by the user, the content server updates the user interface to show that a new contract in PDF has been created, as shown in FIG. 15. However, no actual PDF document is stored. Instead, fragments that made up the new contract are stored. Optionally, if so desired, the actual PDF document may also be stored.

Figure 16:
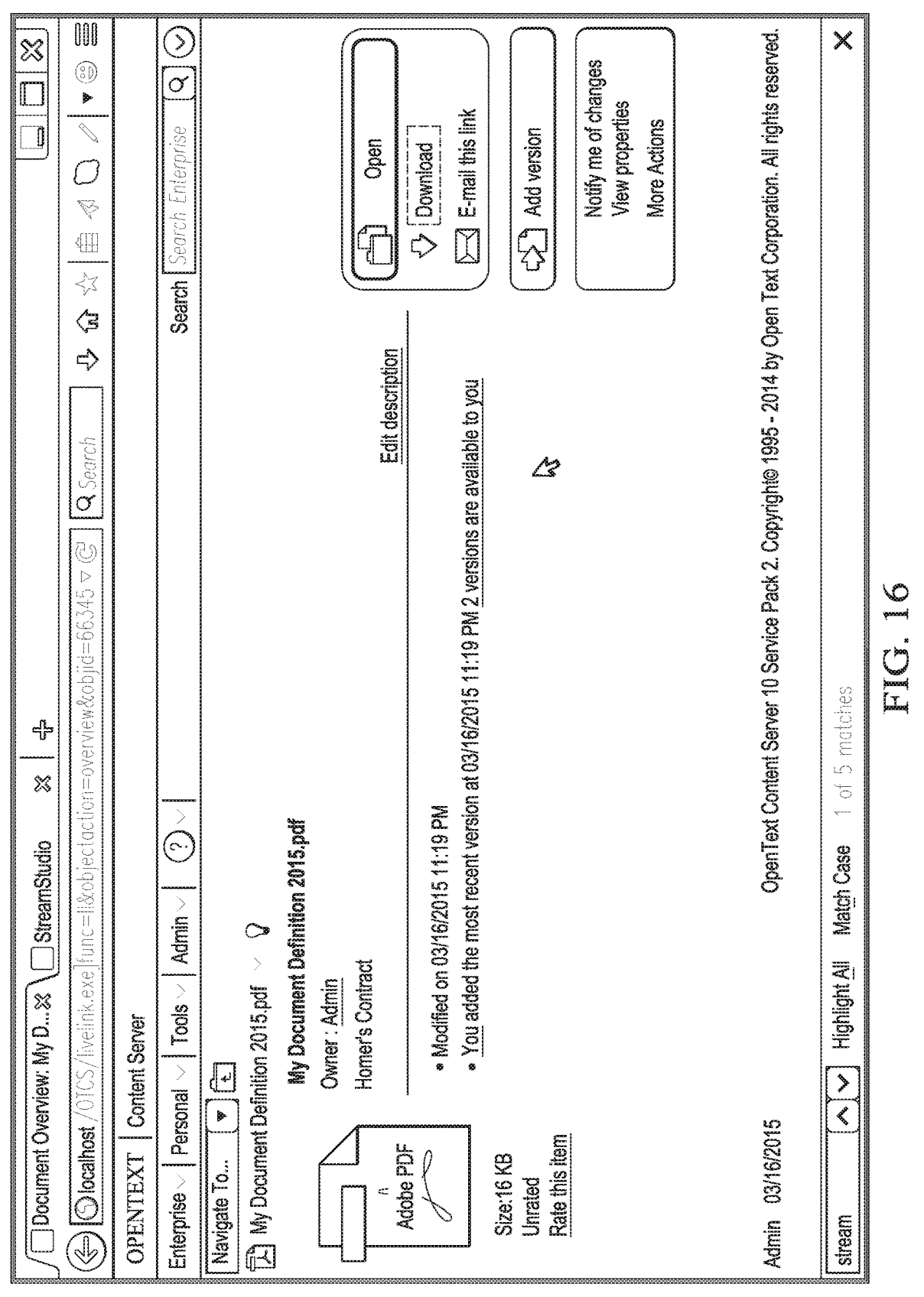

FIG. 16 shows an information page for the newly created "document," including its owner and size. As illustrated in FIG. 16, storing only fragments and not the whole PDF file can result in a significant reduction in storage space (e.g., only 16 KB in this example) that otherwise could be needed to store the whole PDF file.

Figure 17:
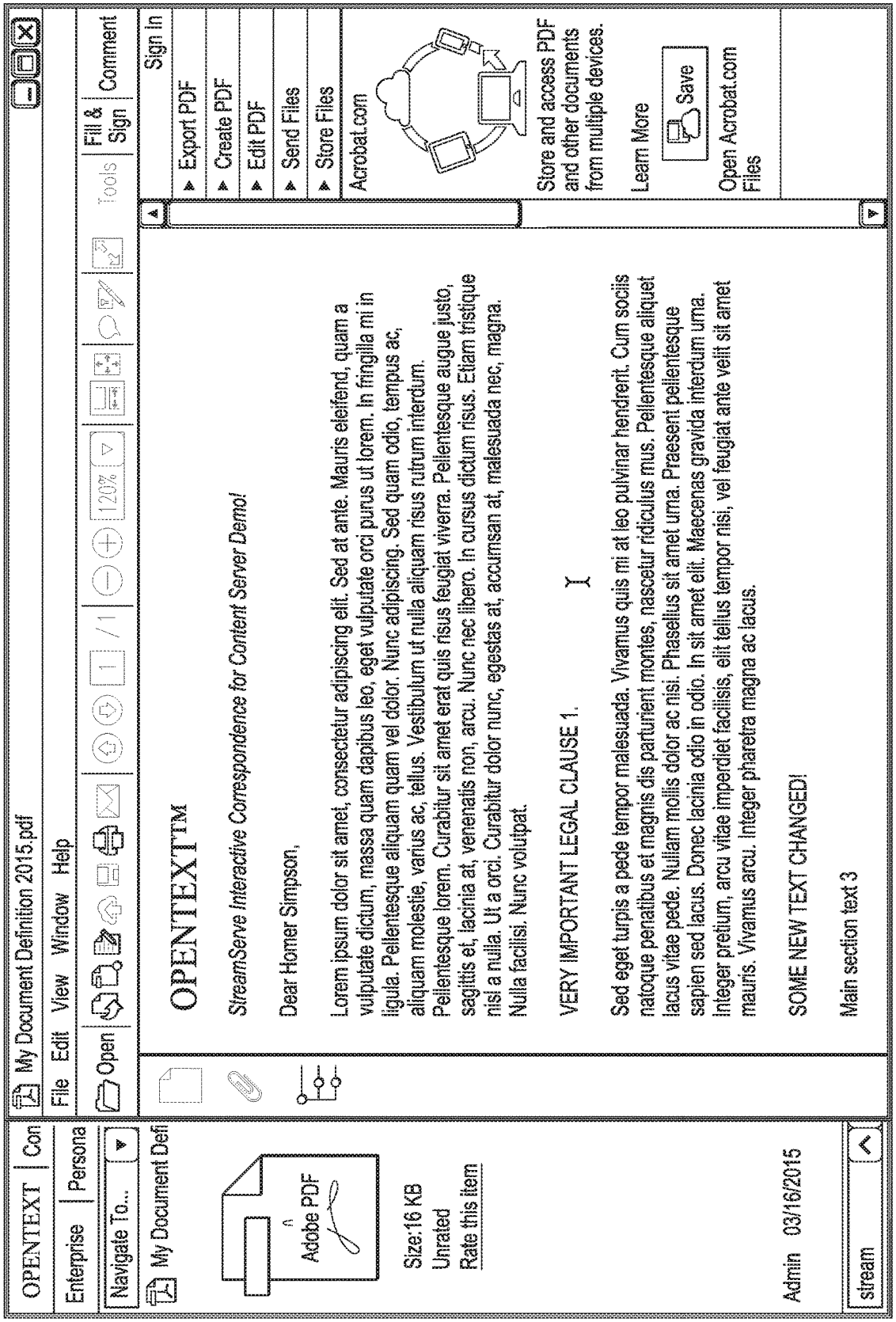

FIG. 17 shows an example of smart rendering at output time. Specifically, FIG. 17 shows a rendition (in PDF) of the newly created contract.

Figure 18:
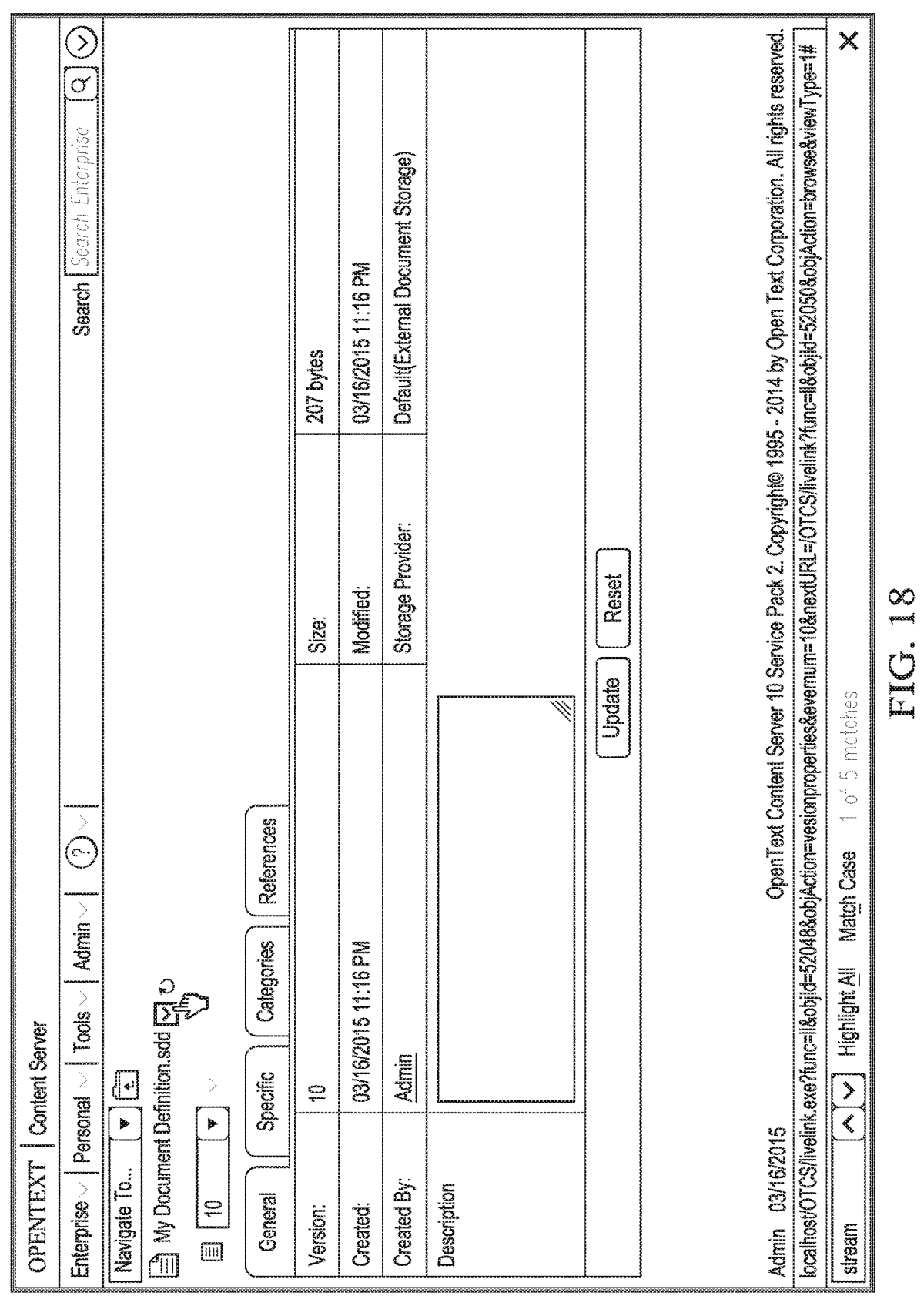
Figure 19:
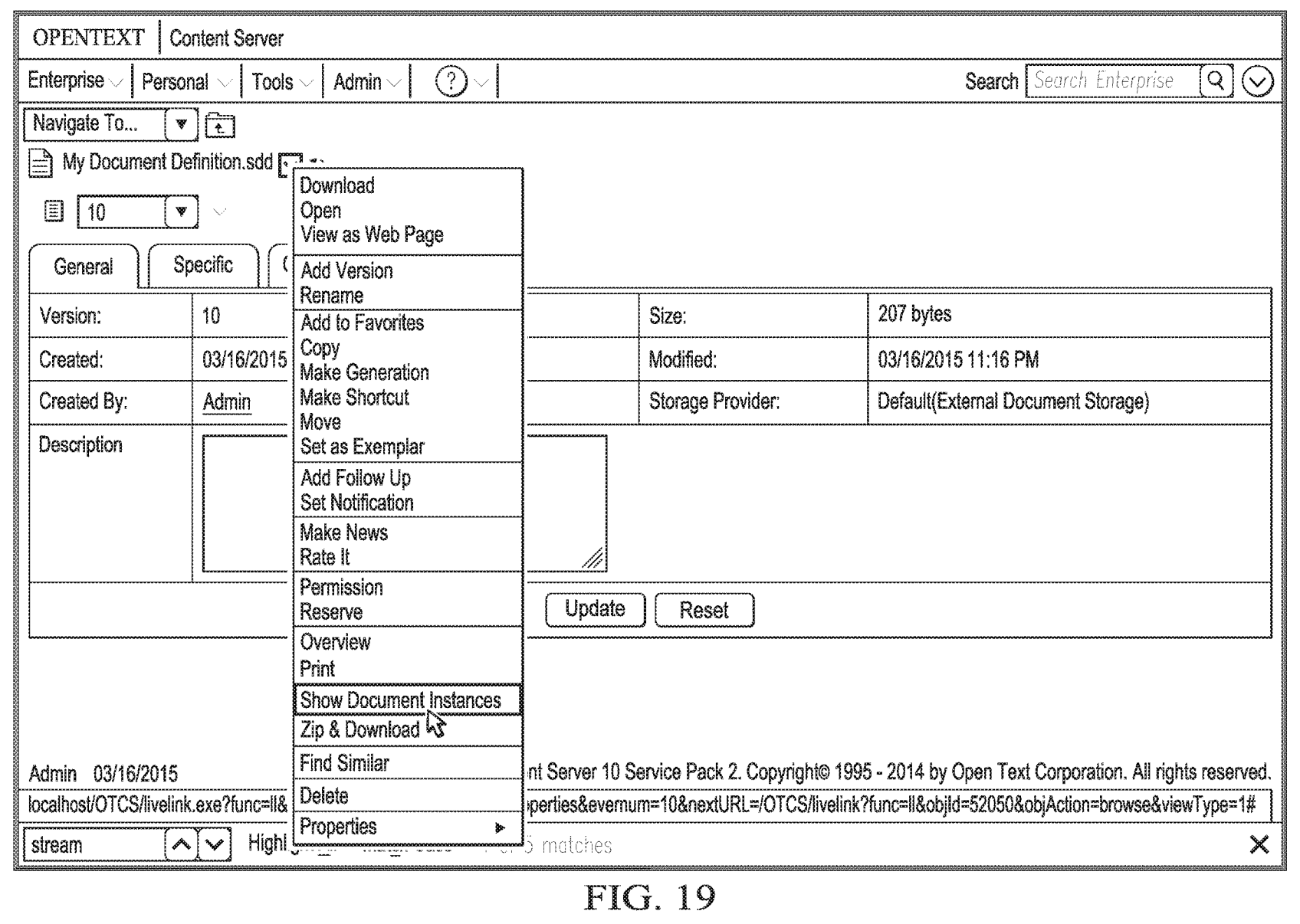

FIGS. 18-19 show how the user may access a binary representation associated with the newly created contract. Specifically, the user can navigate to an .SDD file ("My Document Definition.sdd") containing the binary representation (FIG. 18) and view document instances associated with the newly created contract (FIG. 19).

Figure 20:
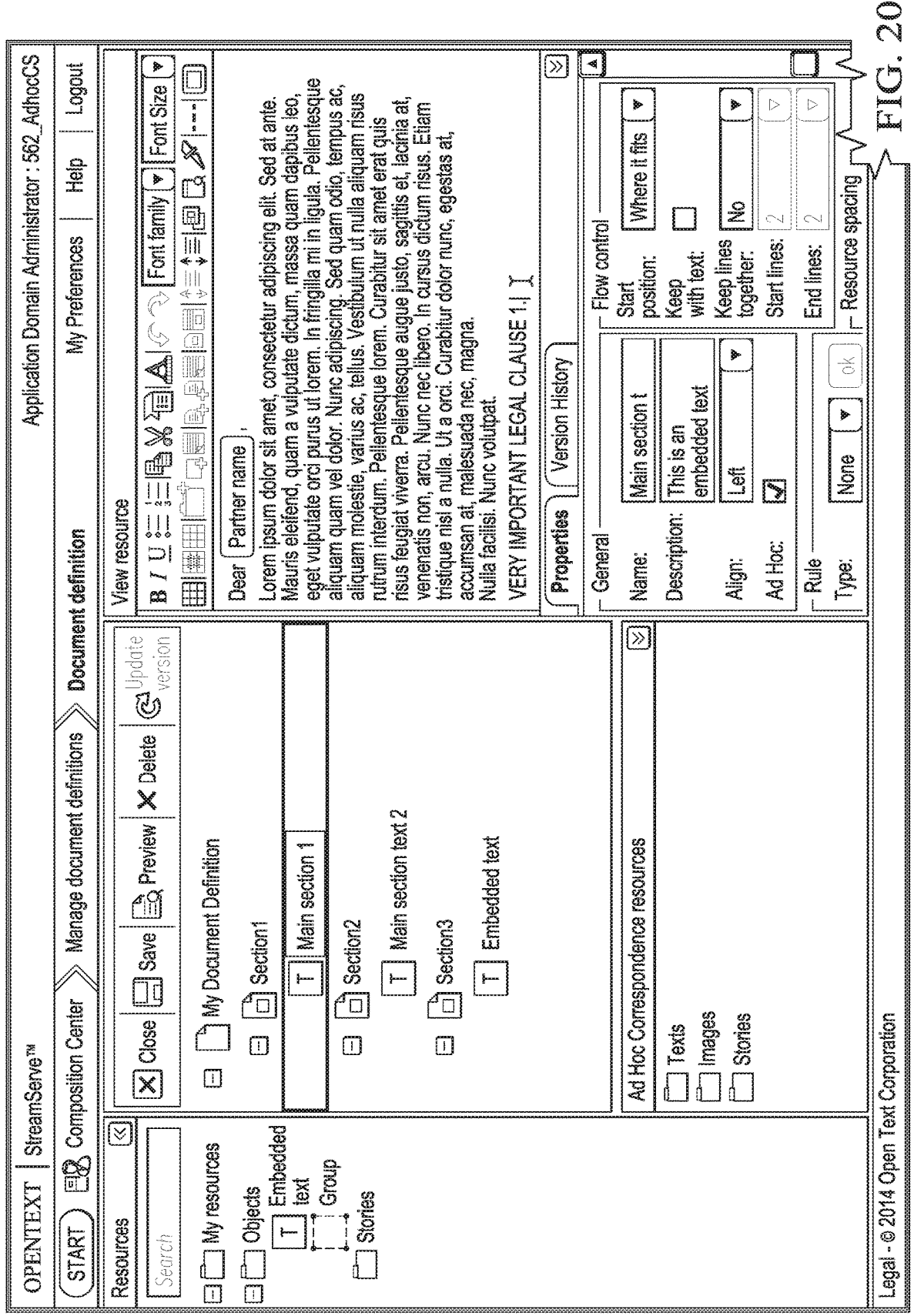

FIG. 20 shows another example of a use case in which a user in the legal department (e.g., of an enterprise that operates the content server of FIG. 10) wants to add or update a legal clause to the contract. In this example, the new contract may include three fragments (Section1, Section2, Section3). When a fragment is highlighted in the user's user interface, the user interface may operate to display a user-editable portion of the fragment in an editor embedded in the user interface, as illustrated in FIG. 20. The newly created or updated fragment (which, in this example, contains the text and formatting information for a legal clause) can be used to generate a new version of the contract. When regenerated/re-rendered, the new version of the document will have the newly created or updated fragment. In some embodiments, the content server is operable to perform this versioning. The content server may access a data storage where a set of fragments are stored (e.g., a document broker plus storage) and communicates a request to the DA system for rendering. The request is sent to an appropriate driver/render and a rendered result (which, in this case, is a new version of the contract with the new or updated fragment) is sent back to the content server (e.g., for use and/or storage by the content server).

Figure 21:
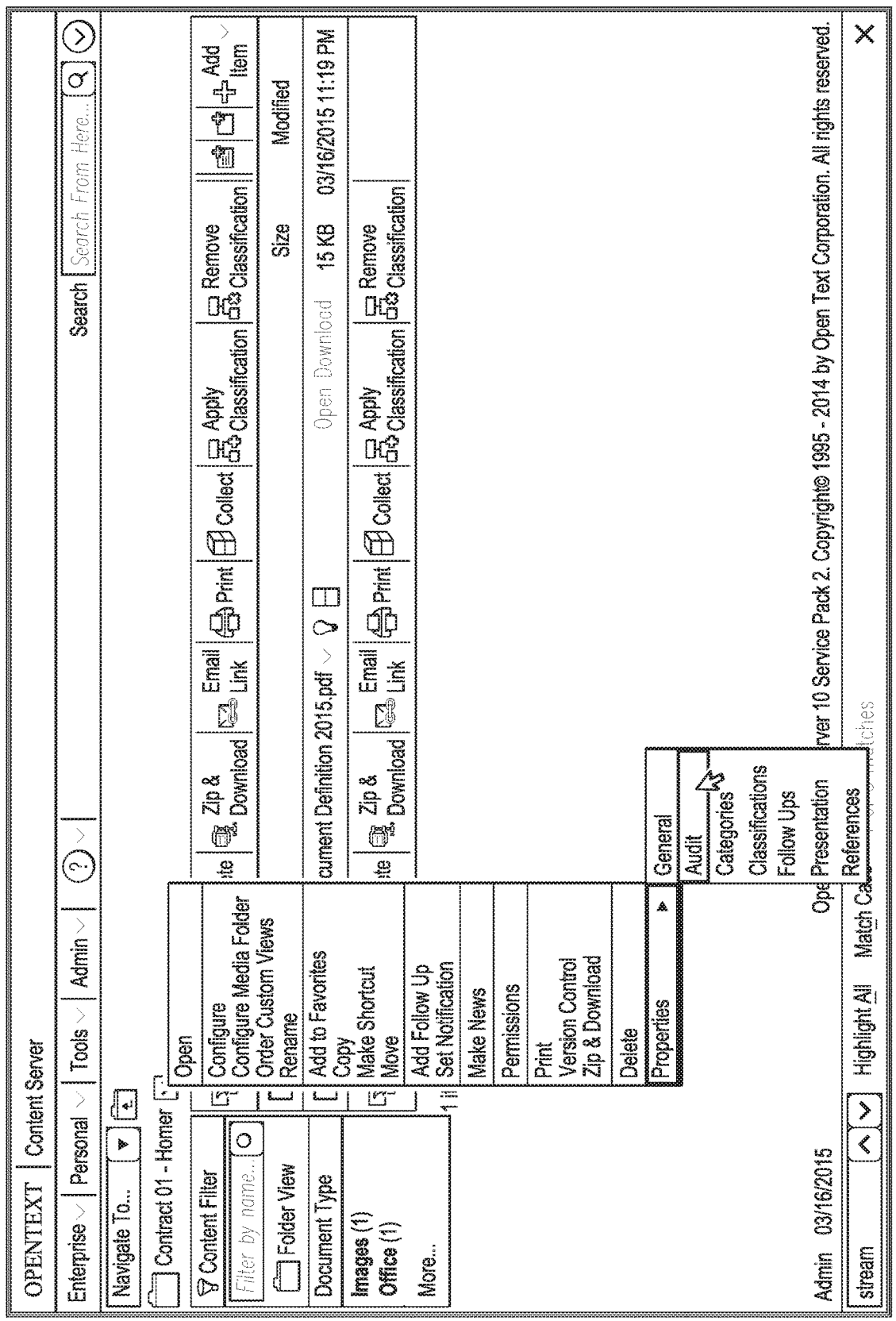

As illustrated in FIG. 21, the user interface of the content server integrated with an example of the DA disclosed herein can include many user-editable properties. In the example of FIG. 21, such properties may differ from document type to document type and can include, for instance, audit, classification, etc.

Figure 22:
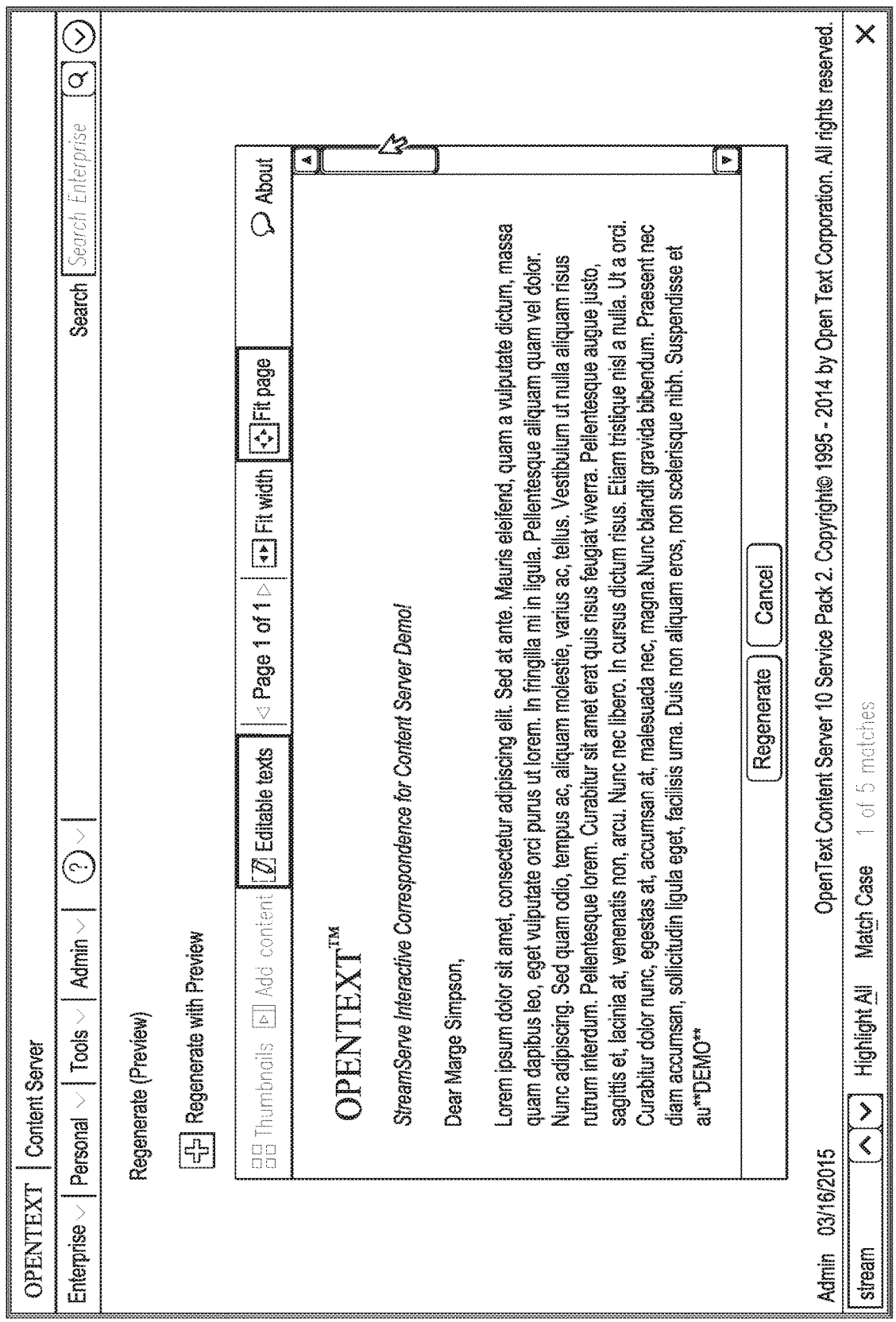

The integrated system (which, in this case, comprises the content server and an example of the DA system described above) can include a very flexible metadata model that describes a document. "Properties" of a document type reflect the metadata of a document of the document type that may be exchanged with real data at rendering/regeneration time. For example, instead of the property "name," the actual name of a user can be used at rendering/regeneration time which, as illustrated in FIG. 22, can be triggered by the user when the regeneration function (e.g., "Regenerate") is invoked from within the user interface.

As illustrated in FIG. 23, and as described above, in some embodiments, the integrated system may not store a document, or any version thereof, in whole. Rather, the integrated system stores fragments and keeps the link to the raw data. Optionally, in some embodiments, the integrated system may store a document of a certain format (e.g., PDF) in whole.

As described above, a system implementing an embodiment of the DA system disclosed herein can include a very flexible metadata model that describes a document. This metadata model can enable users to define custom types that can be used in design, programmatic, and runtime configurations/definitions. Such a metadata model can be viewed as a way to link a designer's project to the resources.

Figure 24:
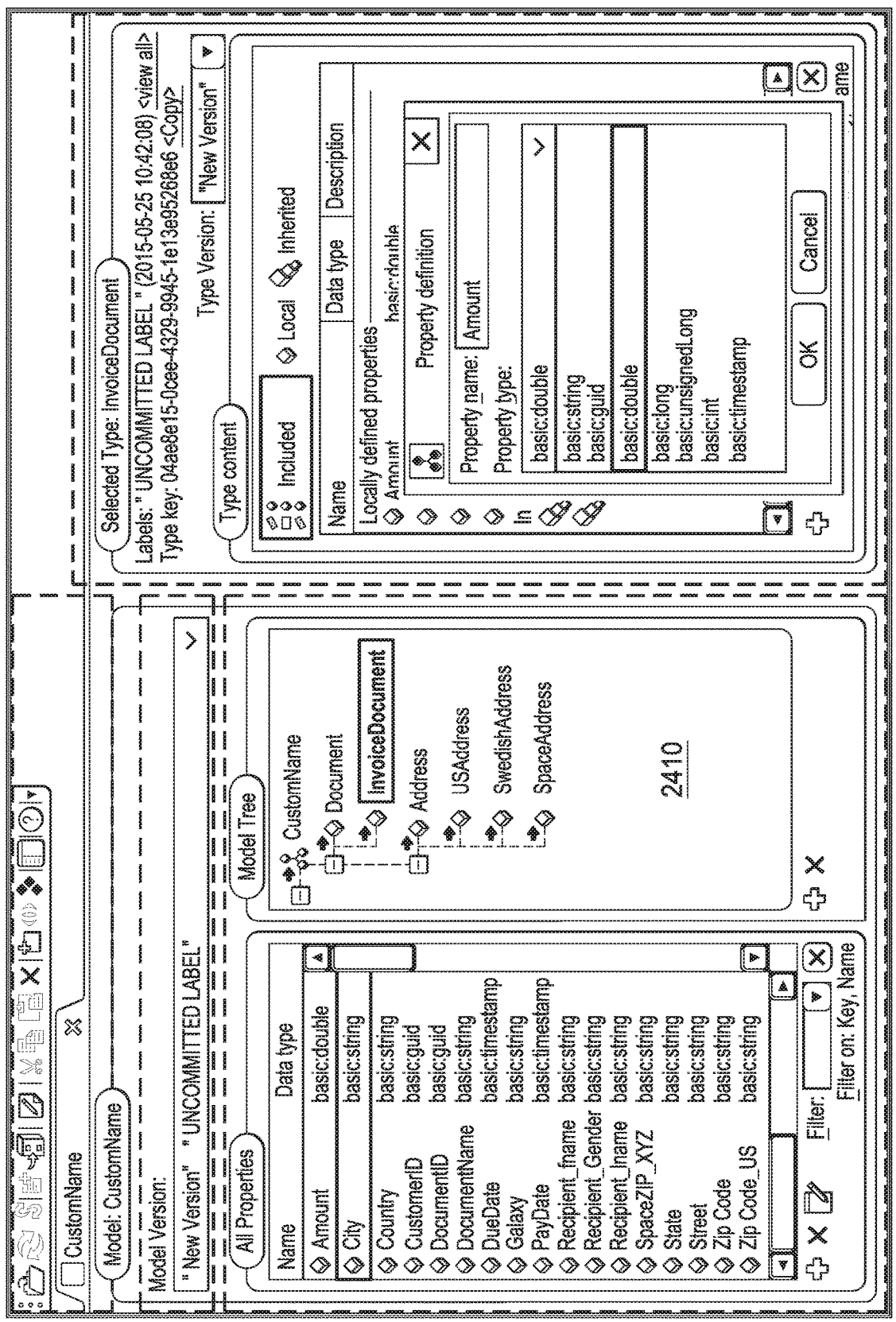
FIG. 24 depicts a diagrammatic representation of a user interface of an example metadata model editor according to some embodiments.

In some embodiments, a metadata model can be accessible via a metadata model editor. FIG. 24 depicts a diagrammatic representation of a user interface of an example of metadata model editor 2400 according to some embodiments. Skilled artisans appreciate that various implementations of a suitable metadata model editor may also be possible.

As illustrated in FIG. 24, metadata model editor 2400 may enable a user to define a property (representing a piece of metadata), giving it a property name and a property type. Each property thus defined may be stored by the metadata model editor in a metadata store according to a particularly configured logical metadata model schema. In the example illustrated, metadata model editor 2400 may enable a user to navigate model tree 2410 with nodes representing custom types that are user-definable (e.g., "Document" type, "Address" type, etc.). Custom types are further described below with reference to FIG. 27.

Figure 25:
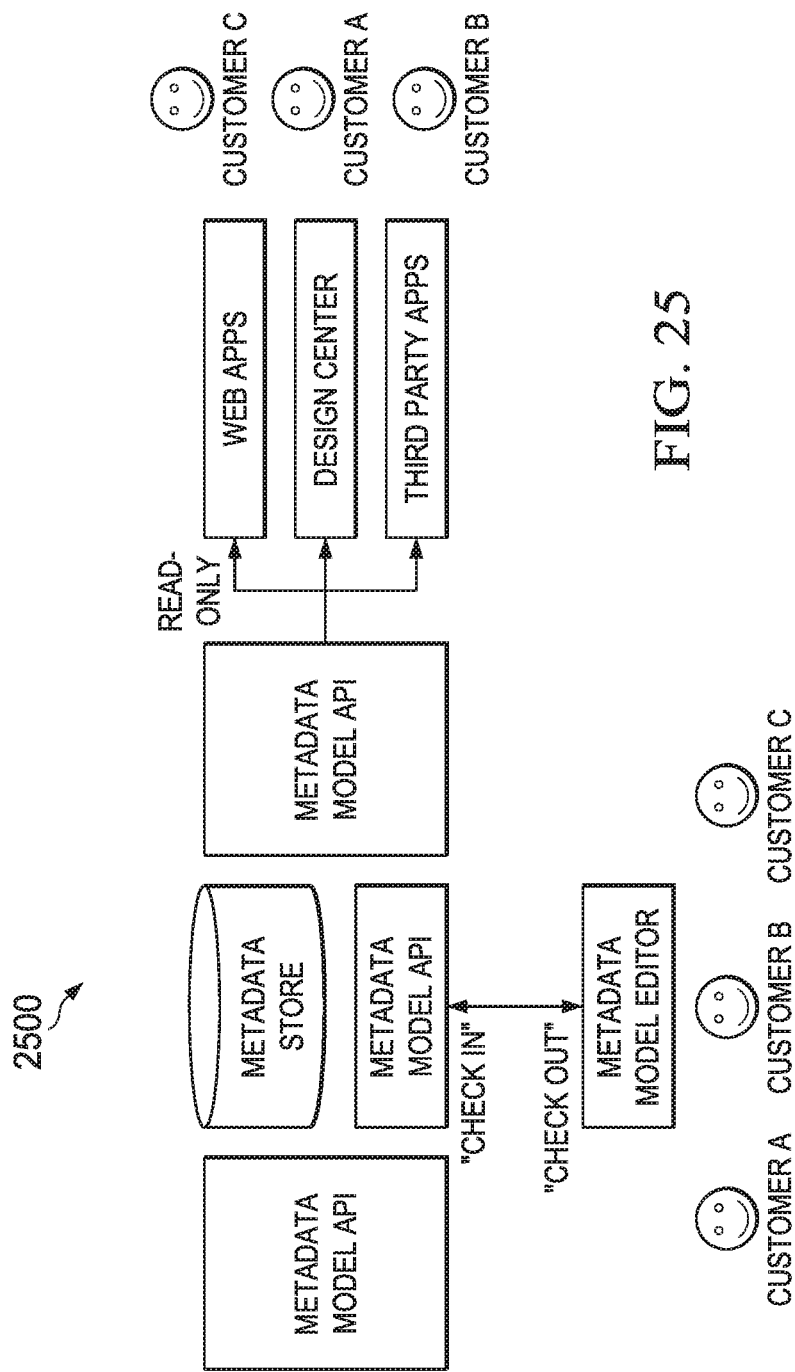
FIG. 25 depicts a diagrammatic representation of various scenarios in which a metadata model may be used at design time according to some embodiments.

FIG. 25 depicts a diagrammatic representation of various scenarios in which a metadata model may be used at design time in enterprise computing environment 2500 according to some embodiments. Examples of design usage of the metadata model may include defining message types (e.g., normalized data types for a message store), defining fragment types (e.g., formatted/un-rendered data types for a document broker plus storage), defining rendered document types (e.g., archived document types), etc.

As illustrated in FIG. 25, in some embodiments, a metadata model can be accessible via metadata model APIs by various applications (e.g., Web apps, a designer's tool such as Design Center or StoryTeller, third-party apps, etc.). Some client applications may only be allowed to read and use types (via the APIs) and some client applications may have the ability to read the metadata model information (via the same APIs). In some embodiments, the metadata model may be provided as a service contained within a tenant's repository and isolated per tenant in a multitenancy environment.

Figure 26:
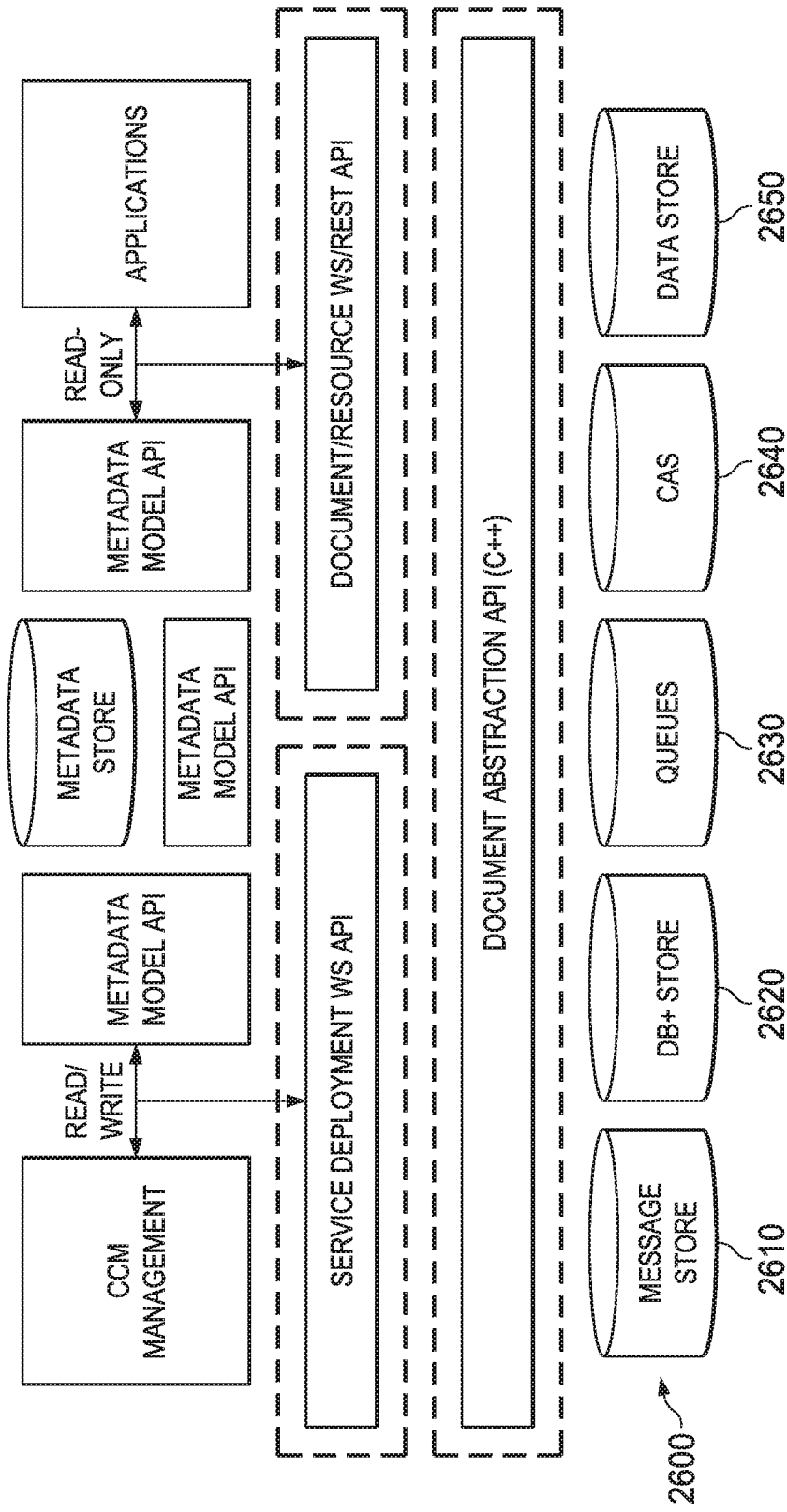
FIG. 26 depicts a diagrammatic representation of various scenarios in which a metadata model may be used at programmatic/runtime according to some embodiments.

FIG. 26 depicts a diagrammatic representation of various scenarios in which a metadata model may be used at programmatic/runtime according to some embodiments. Examples of programmatic usage of a metadata model may include accessing typed message data via a script, integrating a DA system with an information management system (e.g., a content server) or extending an information management system using custom type model definitions, generating flexible user interfaces based on custom type definitions (e.g., relationships, shared, data types, etc.), and so on. The "shared" concept can be visual and represent common ancestors in a metadata hierarchy in which properties (metadata) can be inherited from parent to child.

Examples of runtime usage of a metadata model may include flexible data mapping (e.g., input data can be mapped to typed metadata), storage optimization based on typed metadata (e.g., via document abstraction services to storage layer 2600 which may include, for instance, disparate data storages 2610, 2620, 2630, 2640, and 2650), etc. Alternatively or additionally, storage optimization can be customized based on access patterns.

In some embodiments, the metadata model can combine at least two powerful software engineering patterns in describing types—"is a" (inheritance) and "has a" (aggregation). Combining these patterns can unlock the possibilities to define powerful and flexible models. Further, the metadata model type definition and usage can be closely mapped to physical storage in databases, unlocking unique performance optimization capabilities.

Figure 27:
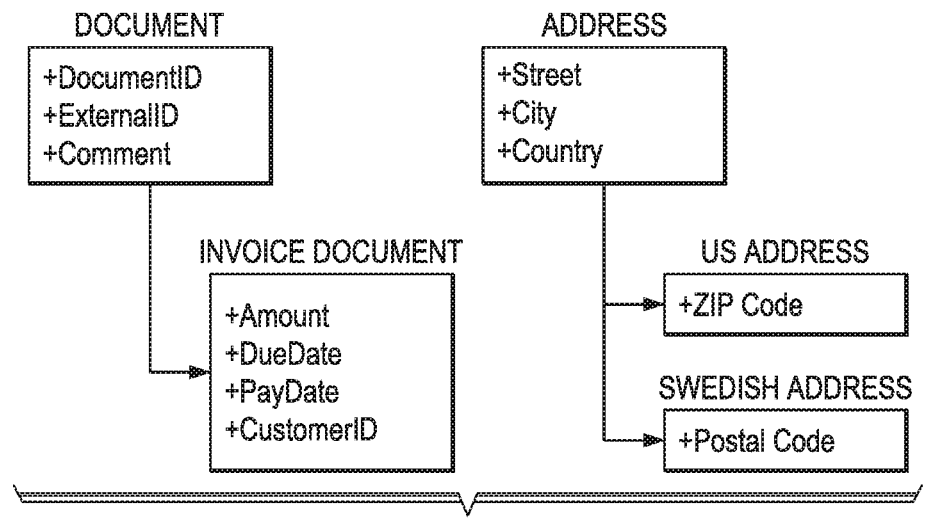
FIG. 27 depicts a diagrammatic representation of examples of custom types that are user-definable via the metadata model editor of FIG. 24 according to some embodiments.

FIG. 27 depicts a diagrammatic representation of examples of custom types that are user-definable via a metadata model editor (e.g., via model tree 2410 of metadata model editor 2400 of FIG. 24) according to some embodiments. In some embodiments, custom types can be defined to present artifacts within a particular domain. In the non-limiting example of FIG. 27, domain 2700 includes two top level custom types "Document" and "Address." The "Invoice Document" is a subtype of the "Document" custom type and "US Address," and "Swedish Address" are subtypes of the "Address" custom type. These custom types can be defined by authorized user(s) of domain 2700.

Figure 28:
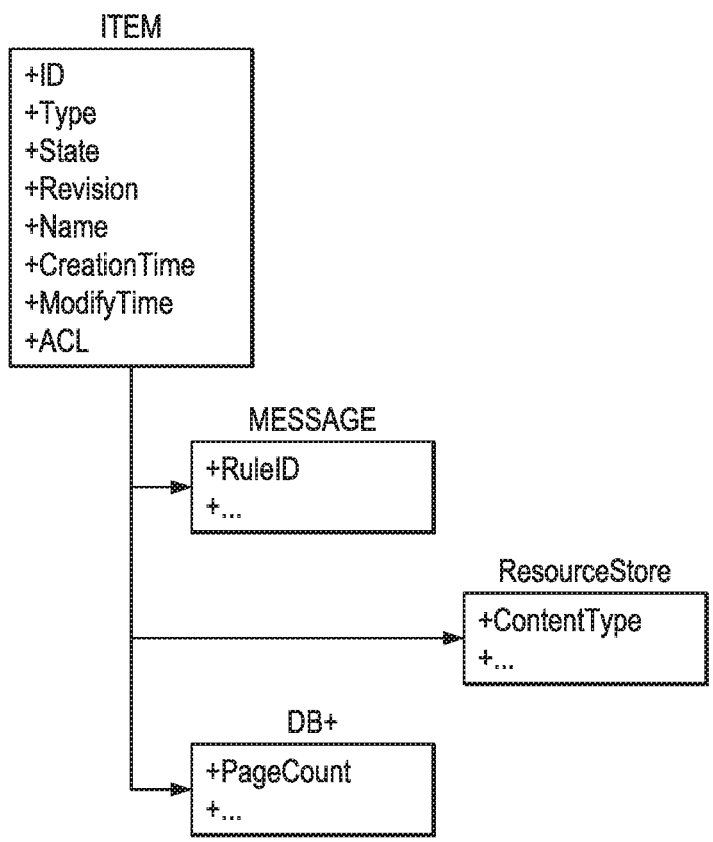
FIG. 28 depicts a diagrammatic representation of examples of system types that can be viewed via the metadata model editor of FIG. 24 according to some embodiments.

Not all metadata model types are defined by domain users. Some embodiments of a metadata model may be particularly configured with a set of system types. FIG. 28 depicts a diagrammatic representation of examples of system types that can be viewed via a metadata model editor (see e.g., FIG. 24) according to some embodiments.

In the non-limiting example of FIG. 28, a metadata model may include system types such as "Item," "Message," "ResourceStore," and "DB+." In some embodiments, the "Message," "ResourceStore," and "DB+" may be subtypes of the "Item" system type. As illustrated in FIG. 28, each system type can have a particular data structure defined by a set of properties (metadata). For example, a message of the "Message" system type may have a data structure configured for storing a rule identifier of a rule applicable to the message. As another example, a fragment of the "DB+" system type may have a data structure configured for storing a page count for keeping track of how many pages references the particular fragment. Some embodiments of a message store disclosed herein can be particularly configured for storing messages of the "Message" system types. Some embodiments of a document broker plus storage disclosed herein can be particularly configured for storing fragments of the "DB+" system types. Other storage types, for instance, CAS resources, archive servers, service directories, queues, etc., may be particularly configured for storing various system types, custom types, and/or complex types.

Figure 29:
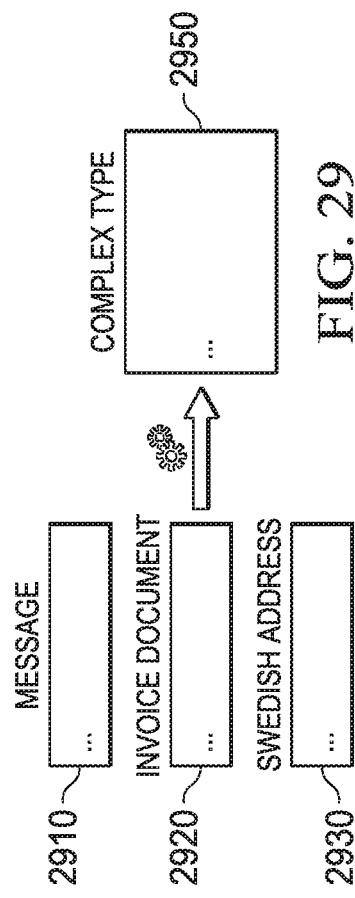
FIG. 29 depicts a diagrammatic representation of an example of a complex type that includes at least one custom type and at least one system type according to some embodiments.

Complex types are not user-definable types. Rather, they can be defined by applications, for instance, a designer's tool such as the Design Center. A complex type may be defined by combining at least one custom type with at least one system type. FIG. 29 depicts a diagrammatic representation of examples of complex types that include at least one custom type and at least one system type according to some embodiments. In the non-limiting example of FIG. 29, combining system type 2910 with custom types 2920 and 2930 results in complex type 2950. A complex type would include an aggregation of all the properties defined in each subtype. This means that versioning would be based on the aggregation of all the subtypes. Accordingly, changing (e.g., adding or removing) at least one subtype from the aggregation would result in a different complex type.

Figure 30:
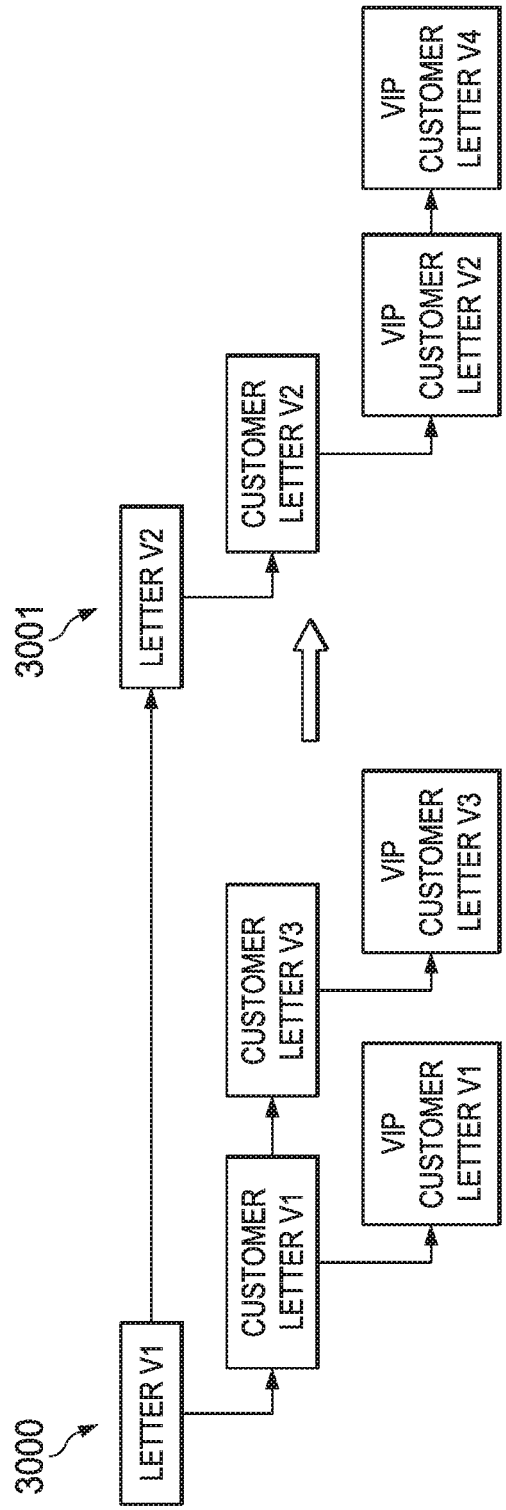
FIG. 30 depicts a diagrammatic representation of an example of a type hierarchy and versioning the type hierarchy according to some embodiments.

In some embodiments, in addition to versioning individual types, versioning of a type hierarchy can be performed at the tenant level in a multitenancy environment. FIG. 30 depicts a diagrammatic representation of an example of a type hierarchy and versioning the type hierarchy according to some embodiments. As illustrated in FIG. 30, entire type hierarchy 3000 can be versioned as another type hierarchy 3001.

Although a metadata model can host multiple custom models as well as multiple system model, access to particular models can be particularly defined per tenant. For example, a metadata model API can be configured to allow access only to a set of custom types defined for authenticated users of a particular tenant associated with the set of custom types. At design time, when a user selects metadata types in a designer's tool, the user can only view and/or use custom types for which the user has been authenticated under a tenant's account for that particular designer's tool. This separation allows each tenant in a multitenancy environment to be able to view and work within a specific tenant-level custom model (which can, for example, represent a subsection of the metadata model).

Figure 31:
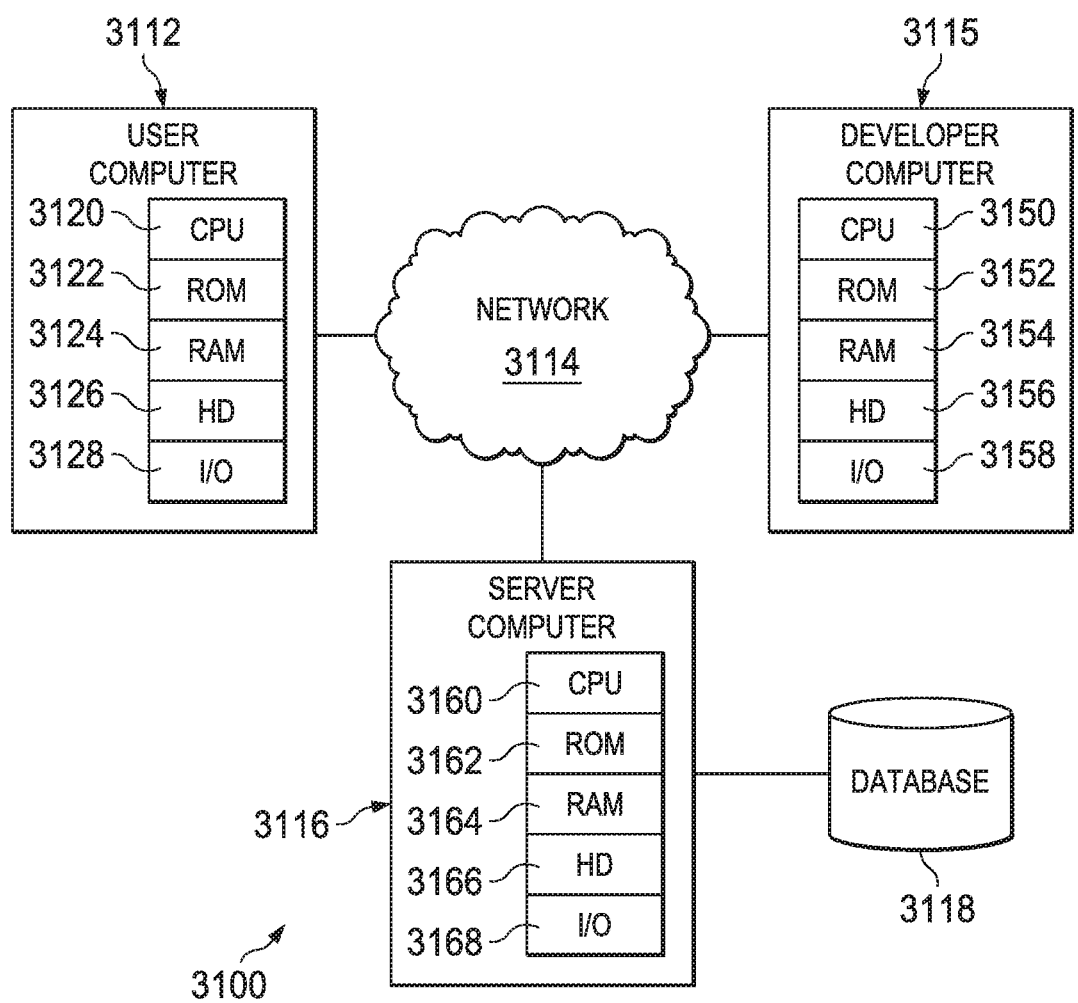
FIG. 31 depicts a diagrammatic representation of an example of an enterprise network computing environment where embodiments disclosed can be implemented.

FIG. 31 depicts a diagrammatic representation of an example of an enterprise network computing environment where embodiments disclosed can be implemented. In the example illustrated, network computing environment 3100 includes network 3114 that can be bi-directionally coupled to user computer 3112, designer computer 3115, and server computer 3116. Server computer 3116 can be bi-directionally coupled to database 3118. Network 3114 may represent a combination of wired and wireless networks that network computing environment 3100 may utilize for various types of network communications known to those skilled in the art.

For the purpose of illustration, a single system is shown for each of user computer 3112, designer computer 3115, and server computer 3116. However, within each of user computer 3112, designer computer 3115, and server computer 3116, a plurality of computers (not shown) may be interconnected to each other over network 3114. For example, a plurality of user computers 3112 and a plurality of designer computers 3115 may be coupled to network 3114. User computers 3112 may include data processing systems for communicating with server computer 3116. Designer computers 3115 may include data processing systems for individuals whose jobs may require them to configure services used by user computers 3112 in network computing environment 3100.

User computer 3112 can include central processing unit ("CPU") 3120, read-only memory ("ROM") 3122, random access memory ("RAM") 3124, hard drive ("HD") or storage memory 3126, and input/output device(s) ("I/O") 3128. I/O 3128 can include a keyboard, monitor, printer, electronic pointing device (e.g., mouse, trackball, stylus, etc.), or the like. User computer 3112 can include a desktop computer, a laptop computer, a personal digital assistant, a cellular phone, or nearly any device capable of communicating over a network. Designer computer 3115 may be similar to user computer 3112 and can comprise CPU 3150, ROM 3152, RAM 3154, HD 3156, and I/O 3158.

Likewise, server computer 3116 may include CPU 3160, ROM 3162, RAM 3164, HD 3166, and I/O 3168. Server computer or computers 3116 may implement an embodiment of the DA system, or an integration thereof, described above. Database 3118 may be a representation of data storages used by the DA system or an integrated system thereof. Many other alternative configurations are possible and known to skilled artisans.

Each of the computers in FIG. 31 may have more than one CPU, ROM, RAM, HD, I/O, or other hardware components. For the sake of brevity, each computer is illustrated as having one of each of the hardware components, even if more than one is used. Each of computers 3112, 3115, and 3116 is an example of a data processing system. ROM 3122, 3152, and 3162; RAM 3124, 3154, and 3164; HD 3126, 3156, and 3166; and database 3118 can include media that can be read by CPU 3120, 3150, or 3160. Therefore, these types of memories include non-transitory computer-readable storage media. These memories may be internal or external to computers 3112, 3115, or 3116.

Portions of the methods described herein may be implemented in suitable software code that may reside within ROM 3122, 3152, or 3162; RAM 3124, 3154, or 3164; or HD 3126, 3156, or 3166. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A system for smart rendering, comprising:
   an output connector communicatively connected to an output delivery channel;
   a data storage storing unique reusable fragments that reference at least one separately stored system-formatted message and that augment the at least one system-formatted message with meta information, the message having a presentation-independent internal system format internal to the system in an enterprise computing environment wherein the presentation-independent internal system format is a binary representation which has no layout and no format; and
   a server machine operating in the enterprise computing environment, the server machine embodying a document processing engine communicatively connected to the output connector and to the data storage, the document processing engine configured for:
   retrieving the fragments from the data storage;
   assembling a document utilizing the fragments and the meta information associated with the fragments, the assembling performed based on instructions from a document definition associated with the document, the document definition including an indication of a subset of fragments required in a document version;
   generating a rendition of the document in a final format for the output delivery channel; and
   storing a final stream containing the rendition of the document and custom metadata describing the rendition in an output queue for the output connector.

2. The system of claim 1, further comprising a queue communicatively connected to the output connector, wherein the document processing engine is further operable to store the rendition of the document in the final format in the queue and wherein the output connector is operable to retrieve the rendition of the document in the final format from the queue.

3. The system of claim 1, wherein the document processing engine is further configured for rendering a plurality of versions of the document, the plurality of versions in different final formats.

4. The system of claim 1, wherein the final format is specific to a device type, a user, a role, or network bandwidth.

5. The system of claim 1, wherein the meta information includes at least one of the document definition, a metadata model, format instructions, or layout instructions for the document.

6. The system of claim 1, wherein the document definition includes information on different fragments of the document, the information including an indication of a subset of fragments required in each document version.

7. The system of claim 6, wherein the document definition further includes an arrangement of the different fragments of the document.

8. A method for smart rendering, comprising:
retrieving unique reusable fragments from a data storage, the retrieving performed by a document processing engine of a document architecture system, the document architecture system comprising a server machine operating in an enterprise computing environment, the fragments referencing at least one separately stored system-formatted message and augmenting the at least one system-formatted message with meta information, the fragments having a presentation-independent internal system format internal to the document architecture system in the enterprise computing environment wherein the presentation-independent internal system format is a binary representation which has no layout and no format;
assembling a document utilizing the fragments and the meta information associated with the fragments, the assembling performed by the document processing engine of the document architecture system, the assembling performed based on instructions from a document definition associated with the document, the document definition including an indication of a subset of fragments required in a document version;
generating a rendition of the document in a final format for an output delivery channel, the generating performed by the document processing engine of the document architecture system; and
storing a final stream containing the rendition of the document and custom metadata describing the rendition in an output queue for an output connector communicatively connected to the document processing engine of the document architecture system and to the output delivery channel.

9. The method according to claim 8, wherein the document processing engine is further operable to store the rendition of the document in the final format in a queue communicatively connected to the output connector and wherein the output connector is operable to retrieve the rendition of the document in the final format from the queue.

10. The method according to claim 8, wherein the document processing engine is further configured for rendering a plurality of versions of the document, the plurality of versions in different final formats.

11. The method according to claim 8, wherein the final format is specific to a device type, a user, a role, or network bandwidth.

12. The method according to claim 8, wherein the meta information includes at least one of the document definition, a metadata model, format instructions, or layout instructions for the document.

13. The method according to claim 8, wherein the document definition includes information on different fragments of the document, the information including an indication of a subset of fragments required in each document version.

14. The method according to claim 13, wherein the document definition further includes an arrangement of the different fragments of the document.

15. A computer program product for smart rendering, the computer program product comprising a non-transitory computer readable storage medium storing instructions translatable by a document processing engine of a document architecture system to perform:
retrieving unique reusable fragments from a data storage, the document architecture system comprising a server machine operating in an enterprise computing environment, the fragments referencing at least one system-formatted message and augmenting the at least one separately stored system-formatted message with meta information, the fragments having a presentation-independent internal system format internal to the document architecture system in the enterprise computing environment wherein the presentation-independent internal system format is a binary representation which has no layout and no format;
assembling a document utilizing the fragments and the meta information associated with the fragments, the assembling performed based on instructions from a document definition associated with the document, the document definition including an indication of a subset of fragments required in a document version;
generating a rendition of the document in a final format for an output delivery channel; and
storing a final stream containing the rendition of the document and custom metadata describing the rendition in an output queue for an output connector communicatively connected to the document processing engine of the document architecture system and to the output delivery channel.

16. The computer program product of claim 15, wherein the document processing engine is further configured for rendering a plurality of versions of the document, the plurality of versions in different final formats.

17. The computer program product of claim 15, wherein the final format is specific to a device type, a user, a role, or network bandwidth.

18. The computer program product of claim 15, wherein the meta information includes at least one of the document definition, a metadata model, format instructions, or layout instructions for the document.

19. The computer program product of claim 15, wherein the document definition includes information on different fragments of the document, the information including an indication of a subset of fragments required in each document version.

20. The computer program product of claim 19, wherein the document definition further includes an arrangement of the different fragments of the document.

* * * * *